US012483737B1

(12) United States Patent
Corcoran et al.

(10) Patent No.: US 12,483,737 B1
(45) Date of Patent: Nov. 25, 2025

(54) MEDIA CHANNEL LAYOUT EVALUATION

(71) Applicant: Tubi, Inc., San Francisco, CA (US)

(72) Inventors: Kevin Edward Corcoran, Media, PA (US); Dennis Paul Yost, Salado, TX (US); Ashley Leigh Hall, Bellefonte, PA (US); Christopher Thomas Sloan, Cedar Park, TX (US); Xugang Yu, Beijing (CN)

(73) Assignee: Tubi, Inc., San Francisco, CA (US)

( * ) Notice: Subject to any disclaimer, the term of this patent is extended or adjusted under 35 U.S.C. 154(b) by 0 days.

(21) Appl. No.: 18/674,693

(22) Filed: May 24, 2024

(51) Int. Cl.
 *H04N 21/235* (2011.01)
 *H04N 21/233* (2011.01)
 *H04N 21/81* (2011.01)

(52) U.S. Cl.
 CPC ....... *H04N 21/2353* (2013.01); *H04N 21/233* (2013.01); *H04N 21/8106* (2013.01)

(58) Field of Classification Search
 CPC ............. H04N 21/2353; H04N 21/233; H04N 21/8106
 See application file for complete search history.

(56) References Cited

U.S. PATENT DOCUMENTS

| | | | |
|---|---|---|---|
| 8,311,390 B2 | 11/2012 | Berry | |
| 10,856,053 B1 | 12/2020 | Shi | |
| 11,336,930 B1 | 5/2022 | Gupta | |
| 11,490,163 B1 | 11/2022 | Das et al. | |
| 11,748,988 B1 | 9/2023 | Chen | |
| 12,259,895 B1 | 3/2025 | Huang | |
| 2008/0263583 A1 | 10/2008 | Heath | |
| 2009/0282016 A1 | 11/2009 | Gabrilovich | |
| 2012/0242900 A1 | 9/2012 | Huang | |
| 2013/0204825 A1 | 8/2013 | Su | |
| 2017/0041684 A1 | 2/2017 | Krishnamurthy | |
| 2018/0192158 A1 | 7/2018 | Smith | |
| 2020/0193552 A1 | 6/2020 | Turkelson | |
| 2021/0065719 A1 | 3/2021 | Wang | |
| 2022/0138805 A1 | 5/2022 | Lemmons | |
| 2022/0150582 A1 | 5/2022 | Nishimura | |

(Continued)

OTHER PUBLICATIONS

Find Your Next Obsession with Tubi's New GPT-4 Powered Content Discovery Feature https://corporate.tubitv.com/press/find-your-next-obsession-with-tubis-new-gpt-4-powered-content-discovery-feature/.

(Continued)

*Primary Examiner* — Anthony Bantamoi
(74) *Attorney, Agent, or Firm* — Redbrick IP, P.C.

(57) ABSTRACT

A system and method for channel layout evaluation including: a computer processor and a channel detective service executing on the computer processor and including functionality to: receive a request to perform channel layout evaluation on a media item including a provided set of channels; perform metadata extraction on the media item to generate a metadata representation of the media item and to identify at least one channel layout discrepancy of the provided set of channels; perform layout detection using the metadata representation by executing a similarity model configured to generate a mix group comprising at least a subset of the provided set of channels, annotating a primary language of the mix group, and annotating a service type of the mix group; and updating the metadata representation with the annotated mix group, wherein the updated metadata representation is provided for streaming the media item.

20 Claims, 23 Drawing Sheets

(56) References Cited

U.S. PATENT DOCUMENTS

| | | |
|---|---|---|
| 2023/0188792 A1 | 6/2023 | Sahasi |
| 2024/0007717 A1 | 1/2024 | Gupta |
| 2024/0259634 A1 | 8/2024 | Koshy |
| 2025/0077552 A1 | 3/2025 | Tsai et al. |

OTHER PUBLICATIONS

Wikipedia Contributors "Multi-armed bandit," Wikipedia, Wikimedia Foundation, Feb. 28, 2023., https://en.wikipedia.org/wiki/Multi-armed_bandit. Accessed Feb. 28, 2023.

Your go-to interactive machine learning library, Feb. 28, 2923., https://vowpalwabbit org/. Accessed Feb. 28, 2023.

Fox Corporation Unveils Atlas https://www.foxcorporation.com/news/business/2022/fox-corporation-unveils-atlas/.

| Channel | Stereo Pair? | Dialog | Low Freq Only |
|---|---|---|---|
| 0 (Front Left) | Yes (mate: chan 1) | Not usually. But if present, quieter or less frequent. | No |
| 1 (Front Right) | Yes (mate: chan 0) | Not usually. But if present, quieter or less frequent. | No |
| 2 (Center) | No | Yes | No |
| 3 (LFE) | No | No | Yes |
| 4 (Surround Left) | Yes (mate: chan 5) | No | No |
| 5 (Surround Right) | Yes (mate: chan 4) | No | No |

FIG. 3

| Channel Count | Possible Layouts |
|---|---|
| 1 | Mono |
| 2 | Stereo |
| 3 | 2.1 (Front Left, Front Right, LFE)<br>3.0 (Front Left, Center, Front Right) |
| 4 | Quad (Front Left, Front Right, Back Left, Back Right)<br>4.0 (Front Left, Front Right, Front Center, Back Center)<br>3.1 (Front Left, Front Right, Front Center, LFE) |
| 6 | 5.1 (Front Left, Front Right, Front Center, LFE, Back Left, Back Right) |
| 8 | 7.1 (Front Left, Front Right, Front Center, LFE, Back Left, Back Right, Surround Left, Surround Right) |

FIG. 14

MEDIA CHANNEL LAYOUT EVALUATION

BACKGROUND

In the landscape of media content delivery and playback, streaming technology has revolutionized the way audiences consume video and audio content. Since the early days of online viewing and streaming, significant advancements have occurred, driven by innovations in Internet infrastructure, compression algorithms, and playback devices. These advancements have led to higher-quality video resolutions, smoother streaming experiences, and greater accessibility to a wide range of content across various devices.

Alongside the evolution of video streaming, the audio component of media content has also seen notable progress and refinement. From traditional stereo audio to immersive multi-channel formats, audio playback technologies have evolved to deliver more engaging and realistic sound experiences to viewers. Supporting multiple channels of audio playback is crucial for catering to diverse audience preferences and content genres. Stereo audio, with its two-channel configuration (left and right), remains a staple for delivering audio content across a wide range of devices and platforms. However, as consumers seek more immersive experiences, the adoption of multi-channel audio formats has become increasingly prevalent.

In addition to diverse audio configurations, media content often includes various types of metadata to enhance accessibility and user experience. This metadata may include audio descriptions for visually impaired viewers, multilingual tracks for international audiences, and subtitles for viewers who prefer or require text-based translations. Managing and delivering these different types of metadata alongside audio channel data present technical challenges for streaming platforms and playback devices alike.

Efficiently encoding and transmitting multi-channel audio streams, along with associated metadata, while maintaining audio quality and minimizing bandwidth usage, require advanced compression algorithms and adaptive streaming techniques. Additionally, ensuring compatibility with a wide range of playback devices and audio setups necessitates standardized audio codecs, metadata formats, and synchronization mechanisms.

The evolution of media streaming and playback technology has transformed the way audiences experience video and audio content. From basic stereo audio to immersive multi-channel formats, the audio component of media content has become increasingly sophisticated, enhancing the overall viewing experience for audiences worldwide. While supporting multiple channels of audio playback and managing various types of metadata pose technical challenges, continued innovation is essential for meeting the growing demands of modern viewers.

SUMMARY

In general, in one aspect, embodiments relate to systems and methods for audio channel layout analysis and evaluation on a media item. This can include metadata extraction, identification of discrepancies, and utilization of a sophisticated similarity model for layout detection. Language annotation and service type detection can also be performed, updating the metadata representation for optimal streaming based on an identified mix group and service type.

In general, in one aspect, embodiments relate to a system for channel layout evaluation. The system can include a computer processor and a channel detective service executing on the computer processor and including functionality to: receive a request to perform channel layout evaluation on a media item including a provided set of channels; perform metadata extraction on the media item to generate a metadata representation of the media item and to identify at least one channel layout discrepancy of the provided set of channels; perform layout detection using the metadata representation by executing a similarity model configured to generate a mix group comprising at least a subset of the provided set of channels, wherein the similarity model utilizes event detection, dialog analysis, and audio configuration analysis to generate the mix group, annotating a primary language of the mix group by aggregating a set of language inferences of the metadata representation corresponding to channels in the mix group, and annotating a service type of the mix group based on the subset of the provided set of channels, the primary language annotation, and, optionally, comparison with at least one other mix group of the media item; and updating the metadata representation with the annotated mix group, wherein the updated metadata representation is provided for streaming the media item using channels of the mix group based on selection of the service type.

In general, in one aspect, embodiments relate to a method for channel layout evaluation. The method can include: (i) receiving a request to perform channel layout evaluation on a media item including a provided set of channels, (ii) performing metadata extraction on the media item to generate a metadata representation of the media item and to identify at least one channel layout discrepancy of the provided set of channels, (iii) performing layout detection using the metadata representation by executing, by a computer processor, a similarity model configured to generate a mix group including at least a subset of the provided set of channels, wherein the similarity model utilizes event detection, dialog analysis, and audio configuration analysis to generate the mix group, annotating a primary language of the mix group by aggregating a set of language inferences of the metadata representation corresponding to channels in the mix group, and annotating a service type of the mix group based on the subset of the provided set of channels, the primary language annotation, and, optionally, comparison with at least one other mix group of the media item; and (iv) updating the metadata representation with the annotated mix group, wherein the updated metadata representation is provided for streaming the media item using channels of the mix group based on selection of the service type.

In general, in one aspect, embodiments relate to a non-transitory computer-readable storage medium having instructions for channel layout evaluation. The instructions are configured to execute on at least one computer processor to enable the computer processor to: (i) receive a request to perform channel layout evaluation on a media item including a provided set of channels, (ii) perform metadata extraction on the media item to generate a metadata representation of the media item and to identify at least one channel layout discrepancy of the provided set of channels, (iii) perform layout detection using the metadata representation by executing a similarity model configured to generate a mix group including at least a subset of the provided set of channels, wherein the similarity model utilizes event detection, dialog analysis, and audio configuration analysis to generate the mix group, annotating a primary language of the mix group by aggregating a set of language inferences of the metadata representation corresponding to channels in the mix group, and annotating a service type of the mix group based on the subset of the provided set of channels, the primary language annotation, and, optionally, comparison with at least one other mix group of the media item, and (iv) update the metadata representation with the annotated mix group, wherein the updated metadata representation is provided for streaming the media item using channels of the mix group based on selection of the service type.

Other embodiments will be apparent from the following description and the appended claims.

BRIEF DESCRIPTION OF THE DRAWINGS

Embodiments are illustrated by way of example, and not by way of limitation, in the figures of the accompanying drawings and in which like reference numerals refer to similar elements.

FIG. 3 is a chart depicting a six channel layout also known as "5.1 channel surround," in accordance with one or more embodiments.

FIG. 14 is a chart depicting possible layouts for various channel counts, in accordance with one or more embodiments.

DETAILED DESCRIPTION

Figure 1A:
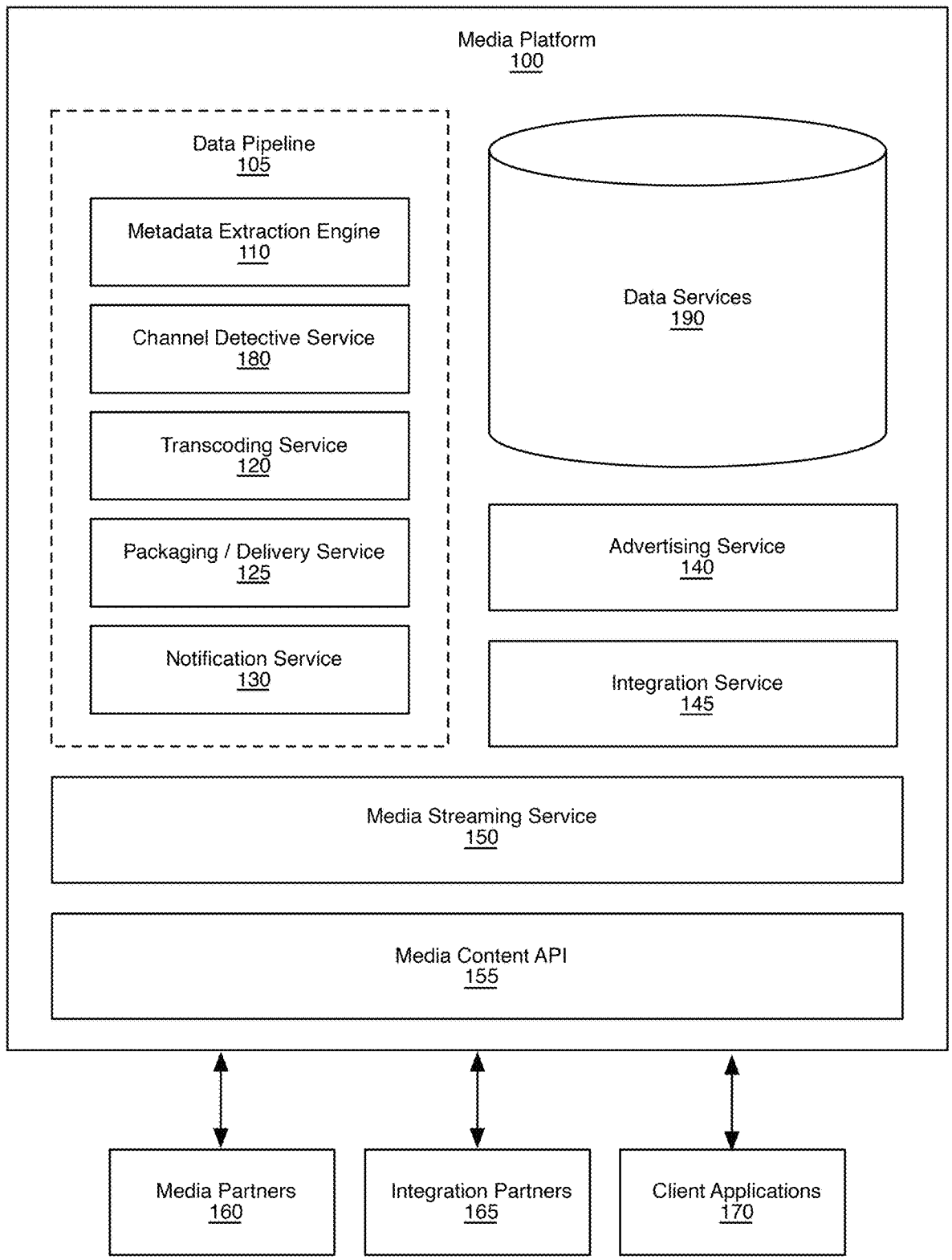
FIGS. 1A-1C show schematic diagrams of a media platform, in accordance with one or more embodiments.

A portion of the disclosure of this patent document may contain material that is subject to copyright protection. The copyright owner has no objection to the facsimile reproduction by anyone of the patent document or the patent disclosure, as it may appear in the Patent and Trademark Office patent file or records, but otherwise reserves all copyrights whatsoever.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the invention. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It will be apparent to one of ordinary skill in the art that the invention can be practiced without these specific details. In other instances, well-known features have not been described in detail to avoid unnecessarily complicating the description.

In general, embodiments of the present disclosure provide methods and systems for performing channel layout evaluation on a media item. Various aspects of the media item may be analyzed sequentially or in parallel to identify gaps or discrepancies in provided channel data. This may include, for example, analysis of an audio component, video component, and/or metadata or attribute information associated with the media item. A channel detection service, in one or more embodiments of the invention, facilitates channel layout evaluation by receiving requests, extracting metadata, identifying discrepancies, and employing a sophisticated similarity model for layout detection. The system may also annotate language and service type, updating the metadata representation for optimal streaming/serving of the media item based on the identified mix group and service type. This comprehensive functionality may address numerous challenges posed by unlabeled channels, multiple languages, and diverse service types in media files, ensuring an improved media consumption experience for end-viewers.

The systems and methods disclosed in the present disclosure include functionality relating to channel layout evaluation and related functionality using various types of media items. For exemplary purposes, though many of the foregoing systems and processes are described in the context of the audio component of a streaming video media item, they can be performed on a variety of different media types and formats, including audio-only (music/speech/nature/scientific), television shows, advertisements, video games, social media posts, and any other media content served to one or more audiences for which it may be desirable to perform channel layout evaluation and/or to optimize the delivery of a mix for streaming or playback of the media item.

For purposes of this disclosure, the following terms are utilized without limitation, in accordance with various embodiments of the invention:

Channel: In one or more contexts, a channel may refer to a discrete stream of audio, typically designed to be played back by a single speaker.

Track: In one or more contexts, the term "track" may refer to a grouping of one or more channels, typically stored together in a digital file.

Layout: In one or more contexts, a protocol or template for content playback including a grouping of one or more channels. The word "mix" or "mix group" is sometimes utilized interchangeably with "layout," though in certain contexts a "mix" is a conceptual grouping of channels inferred by one or more of the systems and methods disclosed herein, whereas "layout" refers to a known template of one or more channels. In certain contexts, a layout can include more than one track, just as a track may include more than one channel.

FIG. 1A shows a media platform 100, media partners 160, integration partners 165, and client applications 170, in accordance with one or more embodiments. As shown in FIG. 1A, the media platform 100 has multiple components including a data pipeline 105 including a metadata extraction engine 110, a channel detective service 180, a transcoding service 120, a packaging/delivery service 125, and a notification service 130, as well as data services 190, an advertising service 140, an integration service 145, a media streaming service 150, and a media content application programming interface (API) 155. Various components of the messaging platform 100 can be located on the same device (e.g., a server, mainframe, a virtual compute resource residing in a virtual private cloud (VPC), a desktop Personal Computer (PC), laptop, telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment.

In one embodiment of the invention, the channel detective service 180 is a component of the data pipeline 105. The arrangement of the components and their corresponding architectural design are depicted as being distinct and separate for illustrative purposes only. Many of these components can be implemented within the same binary executable, containerized application, virtual machine, pod, or container orchestration cluster. Performance, cost, and application constraints can dictate modifications to the architecture without compromising function of the depicted systems and processes.

In one or more embodiments, the media platform 100 is a platform for facilitating analysis, streaming, serving, and/or generation of media-related content. For example, the media platform 100 may store or be operatively connected to services storing millions of media items such as movies, user-generated videos, music, audio books, and any other type of media content. The media content may be provided for viewing by end users of a video or audio streaming service (e.g., media streaming service 150), for example. Media services provided by the media platform 100 can include, but are not limited to, advertising media services, content streaming, preview or user-generated content generation and streaming, and other functionality disclosed herein.

In one or more embodiments of the invention, the media platform 100 is a technology platform including multiple software services executing on different novel combinations of commodity and/or specialized hardware devices. The components of the media platform 100, in the non-limiting example of FIG. 1A, are software services implemented as containerized applications executing in a cloud environment. The data pipeline 105, channel detective service 180, and related components can be implemented using specialized hardware to enable parallelized analysis and performance. Other architectures can be utilized in accordance with the described embodiments.

In one or more embodiments of the invention, the channel detective service 180 and other components of the data pipeline 105, the advertising service 140, the integration service 145, the media streaming service 150, and the media content application programming interface (API) 155 are software services or collections of software services configured to communicate both internally and externally of the media platform 100, to implement one or more of the functionalities described herein.

The systems described in the present disclosure may depict communication and the exchange of information between components using directional and bidirectional lines. Neither is intended to convey exclusive directionality (or lack thereof), and in some cases components are configured to communicate despite having no such depiction in the corresponding figures. Thus, the depiction of these components is intended to be exemplary and non-limiting. For example, one or more of the components of the media platform 100 may be communicatively coupled via a distributed computing system, a cloud computing system, or a networked computer system communicating via the Internet.

Channel Layout Evaluation Overview

In one or more embodiments of the invention, the channel detective service 180 forms a crucial element within a system devised for evaluating channel layouts, particularly in the context of media streaming. The channel detective service 180 includes functionality to analyze media items (e.g., digital audio components and metadata of a media item), to determine the most suitable channel mix for subsequent streaming. Through a series of intricate functionalities, the channel detective service 180 ensures that the audio delivered to end-viewers is appropriately mixed, thereby enhancing the overall viewing experience.

Terminology

Channels, in one or more embodiments of the invention, can refer to individual streams of audio data. Each channel may be intended for playback through a specific speaker, earpiece, or another context. The channel might have an associated position, such as "Front Left" or "Center," which is intended to guide its playback through a particular speaker to achieve a desired spatial audio effect. However, the assignment of channels to specific positions can be flexible, allowing for a wide range of audio configurations depending on the implementation.

Tracks, in one or more embodiments of the invention, might encapsulate one or more channels (e.g., within a single digital file). This organization allows for the management and synchronization of audio content, where tracks act as containers for channels, facilitating complex audio compositions. A track could, for instance, contain all channels necessary for a piece of music, ensuring they are played back in harmony.

The relationship between channels and tracks offers flexibility in how audio is composed and distributed. However, it may also introduce complexity for entities processing this audio, as channels can be combined into tracks in various ways without consistent labeling, making it challenging to manipulate the audio as intended.

In one or more embodiments of the invention, mixes can be conceptualized as groupings of channels that dictate how these channels should be combined for playback, rather than reflecting their current arrangement within tracks. This concept is particularly useful when tracks do not have clear labels or when channels are organized in a non-intuitive manner across tracks. A mix could encompass multiple tracks or specific channels within a track, serving as a guide for reconfiguring audio to achieve a particular auditory experience.

Language

In one or more embodiments of the invention, audio tracks and mixes may primarily cater to a specific language, aiming to serve the linguistic preferences of the target audience. Nevertheless, content might also feature characters speaking in various languages, adding complexity to the identification and categorization of languages within tracks. In one or more embodiments of the invention, components of the media platform 100 include functionality to detect languages present in audio tracks and organize them into mixes that correspond to different linguistic groups, thereby enhancing accessibility and user choice.

Service Type

In one or more embodiments of the invention, mixes may also be distinguished by their service type, which indicates the intended use or audience of the audio mix. Possible service types include but are not limited to, main audio (the standard audio mix in the primary language of the content), dub audio (a version of the main audio in a different language), and description (an enhanced version of the main audio that includes additional narration for visually impaired users). This differentiation allows for the creation of audio content that is accessible and enjoyable to a broad spectrum of users. In one or more embodiments of the invention, components of the media platform 100 include functionality to automatically identify and categorize audio tracks according to their service types.

Figure 2A:
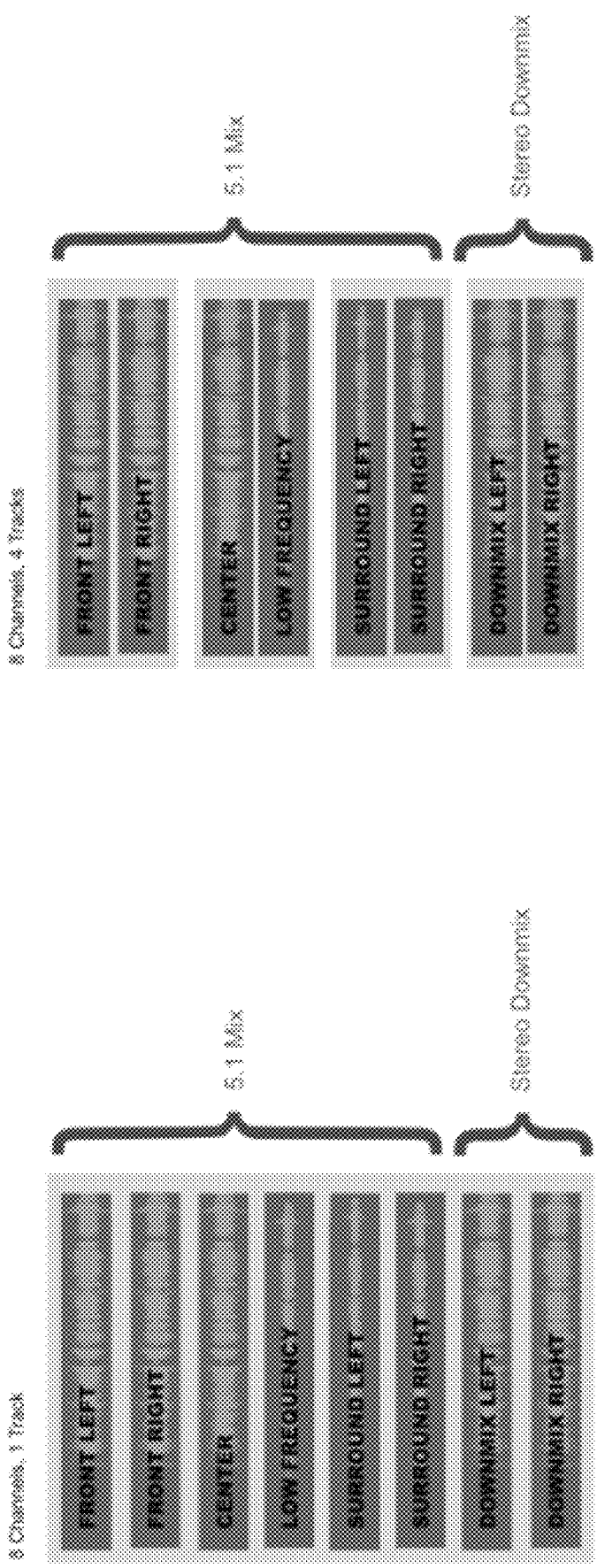
FIGS. 2A-2C show diagrams depicting different combinations of channels, tracks, and mixes, in accordance with one or more embodiments.
Figure 2B:
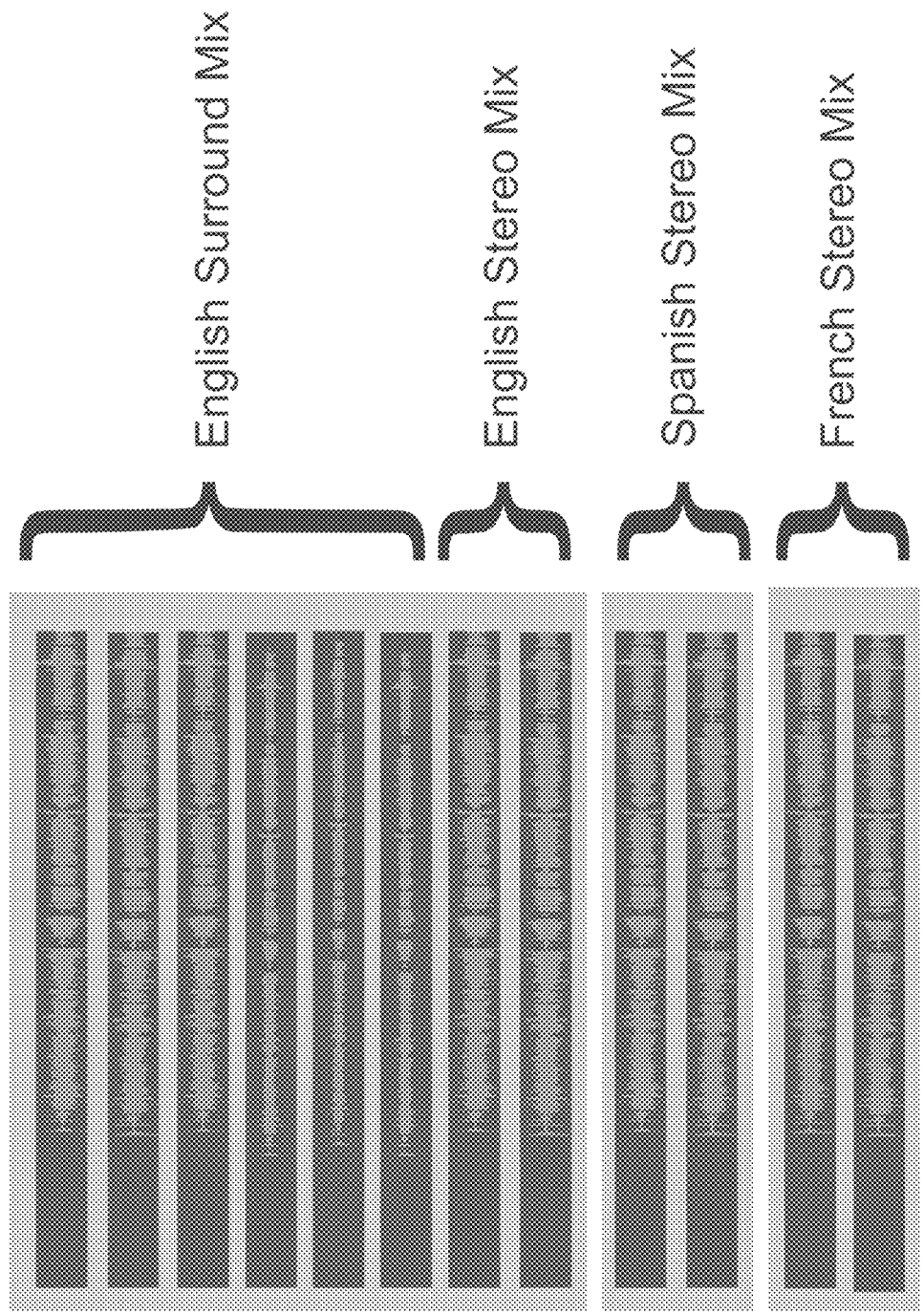
Figure 2C:
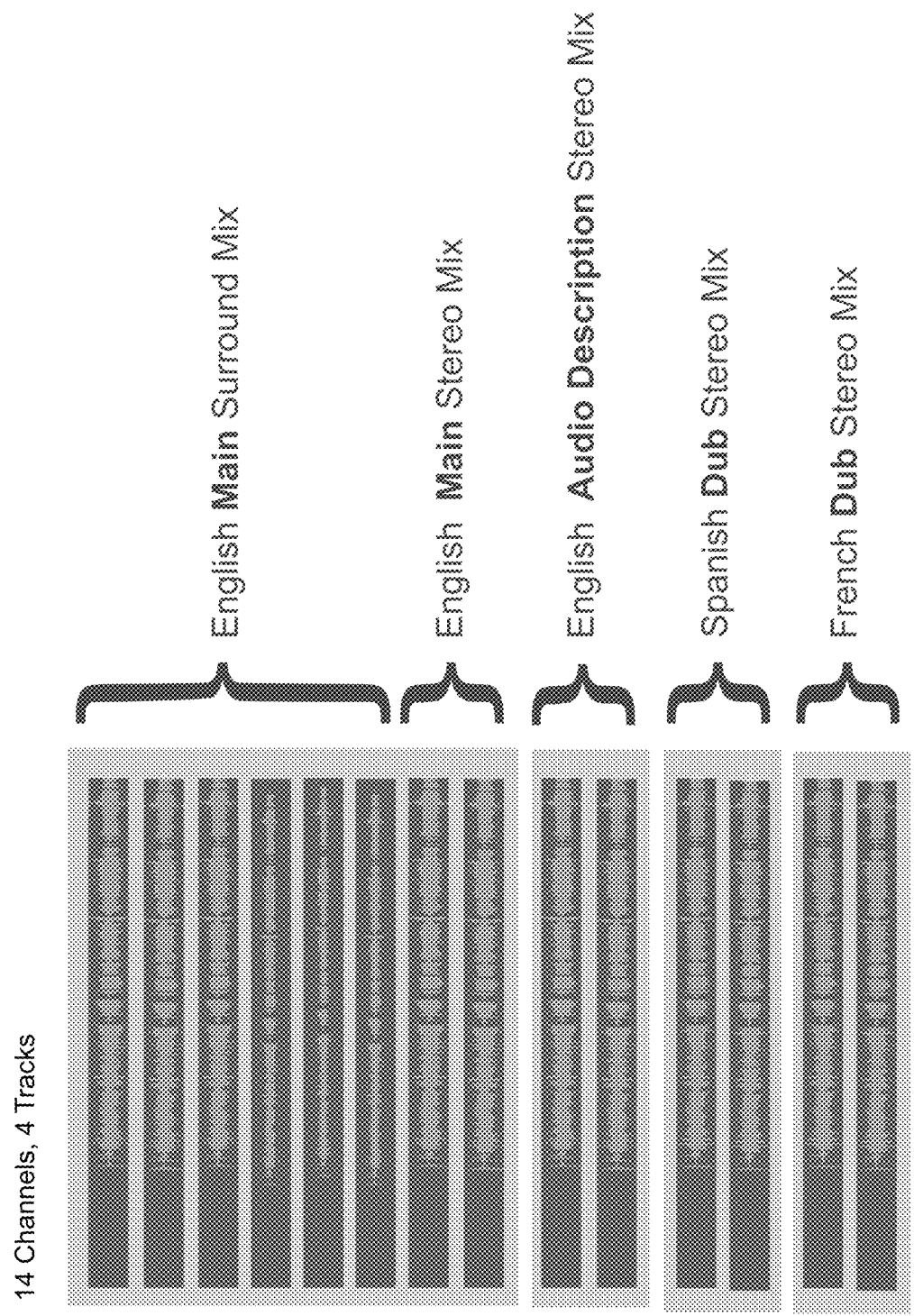

FIGS. 2A, 2B, and 2C depict various different example combinations of channels, tracks, and mixes, including multiple languages and service types.

In one or more embodiments of the invention, audio files provided by content partners or other sources may contain numerous channels, and may lack any indication of channel layout, language, and service types for those channels. In one or more embodiments of the invention, components of the media platform 100 include functionality to avoid costly and error-prone operator entry of those attributes by analyzing audio to identify the missing channel layout, language, and service type information. For purposes of this disclosure, the term "content partner" can include content owners, licensed third-party content providers, and/or other entities from which content can be obtained, in accordance with various embodiments of the invention.

Figure 1B:
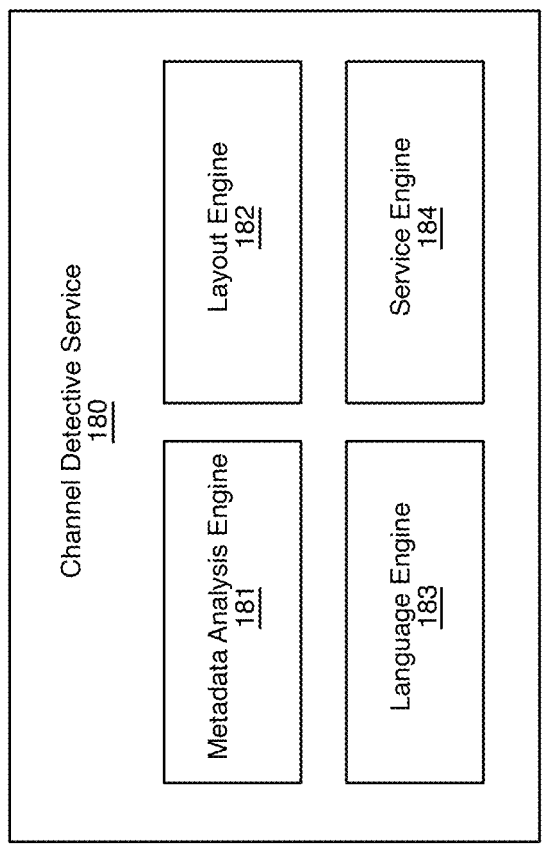

FIG. 1B shows a channel detective service 180 in accordance with one or more embodiments. As shown in FIG. 1B, the channel detective service 180 has multiple components including a metadata analysis engine 181, a layout engine 182, a language engine 183, and a service engine 184. Various components of the channel detective service 180 can be located on the same device (e.g., a server, mainframe, virtual server in a cloud environment, and any other device) or can be located on separate devices connected by a network (e.g., a local area network (LAN), the Internet, a virtual private cloud, etc.). Those skilled in the art will appreciate that there can be more than one of each separate component running on a device, as well as any combination of these components within a given embodiment.

In one or more embodiments of the invention, the channel detective service 180 is intricately designed to enhance the processing and management of audio channels within digital media files. This comprehensive service includes a suite of components, each with distinct functionalities, tailored to ensure the selection and delivery of the highest quality and best-suited audio to clients.

In one or more embodiments of the invention, the metadata analysis engine 181 includes functionality to scrutinize audio track structures within digital media files to discern and extract metadata information, which can often be incomplete or entirely absent in the source media file(s). For example, this engine 181 can analyze an array of up to 44 source audio channels, determining which of these channels are necessary based on the metadata and which may be superfluous. The metadata analysis engine 181 may be configured to detect whether the tracks contain labeling for channel positions and languages. In the absence of such labels, the metadata analysis engine 181 can infer the intended use of each channel based on typical metadata patterns observed in standard mixes. An exemplary case is when the engine identifies a pair of channels with identical or complementary metadata patterns, suggesting a stereo configuration despite the lack of explicit labeling.

In one or more embodiments of the invention, the layout engine 182 includes functionality to map the selected audio channels to the appropriate output configuration. In one or more embodiments of the invention, the system accommodates a diverse spectrum of channel layouts, ensuring compatibility with a wide range of audio configurations. For example, the layout engine 182 may be configured to manage various standard and non-standard audio layouts. These layouts can range from the simple monaural (mono) configuration, which employs a single audio channel, to the more complex and immersive setups such as the 7.1.4 surround sound system, which utilizes a total of 12 channels including height speakers for a three-dimensional audio experience. Other supported layouts include the traditional 2-channel stereo that creates a dimensional sound field, the common 5.1 surround sound setup with five full-range channels plus a subwoofer for low-frequency effects, and the 7.1 surround sound configuration which adds two additional channels to the standard 5.1 layout, enhancing the perception of depth and directionality of sound. The Layout Engine 182 is also equipped, in one or more embodiments of the invention, to handle binaural audio for headphones, providing a 3D stereo sound sensation, as well as advanced object-based audio formats like Dolby Atmos, which allow for the precise placement of individual sounds in a three-dimensional space. This flexibility ensures that the channel detective service 180 can provide an optimal listening experience across various playback systems, catering to the diverse preferences and requirements of viewers, clients, and content providers.

In one or more embodiments of the invention, utilizing an understanding of common mix attributes, the layout engine 182 includes functionality to position channels to align with standard audio layouts. For instance, in a stereo mix scenario, the engine 182 can ensure that matched channels are accurately aligned to the left and right speakers, maintaining the correct balance and spatial orientation. In more complex setups such as a 5.1 surround sound mix, the layout engine 182 positions channels around the hypothetical listener, correctly placing the Front Left, Front Right, Center, LFE, Surround Left, and Surround Right channels as per industry-standard speaker layouts.

FIG. 3 depicts a table including attributes of a known layout, in accordance with one or more embodiments of the invention. In one or more embodiments of the invention, the channel detective service 180 incorporates functionality specifically designed to analyze digital audio tracks and assign attributes to each channel, thereby identifying known audio channel layouts, such as the 5.1 channel surround sound layout depicted by FIG. 3. This identification process involves assessing each channel's characteristics, including whether it forms part of a stereo pair, its role in carrying dialog, and its exclusive dedication to low-frequency sounds. For example, within the context of the 5.1 channel surround layout depicted in FIG. 3, the system identifies the Front Left (Channel 0) and Front Right (Channel 1) as constituting a stereo pair, typically not designated for dialog, or if dialog is present, it is quieter or less frequent, and these channels are not confined to low-frequency output. The Center channel (Channel 2) is pinpointed for its critical role in dialog delivery, not forming part of a stereo pair, and not limited to low-frequency sounds. The Low Frequency Effects (LFE) channel (Channel 3) is uniquely recognized for its exclusive output of low-frequency sounds, absent of dialog. Similarly, the Surround Left (Channel 4) and Surround Right (Channel 5) are classified as a stereo pair, not primarily used for dialog, which contributes to the overall immersive audio experience without focusing on low-frequency sounds. In one or more embodiments of the invention, the channel detective service 180 includes functionality to utilize the attributes of the known layout, such as number of channels, dialog, frequency, and more, to "slot" or infer one or more mixes for the media file.

Asset Evaluation

In one or more embodiments of the invention, the channel detective service 180 includes a preliminary assessment stage where the source files provided by content partners undergo an initial evaluation to determine the necessity for further processing. In this phase, the channel detective service 180 discerns whether the audio channels are already in a format suitable for transcoding without additional intervention.

In one or more embodiments of the invention, the metadata analysis engine 181 carries out this evaluation by checking for unambiguous channel labeling within the source files. For example, if a source file contains a single stereo pair with clearly marked labels such as 'Left' and 'Right,' or if all channels are unambiguously labeled with their intended positions and languages, the metadata analysis engine 181 deems the asset as one that can bypass the full suite of channel detective processing. This direct-to-transcode approach is advantageous for files that adhere to conventional audio layouts and labeling practices.

On the other hand, if the source files lack channel layout labels or language labels, or they present an unconventional number of channels, the channel detective service 180 is configured to flag these for comprehensive processing. The channel detective service 180 then executes systems and processes to ensure that the channels are accurately identified, labeled, and arranged before transcoding. This ensures that regardless of the complexity or non-standard configuration of the source audio channels, the final output delivered to end clients will meet the required standards for audio quality and layout conformity.

Each of the components of the Channel Detective Service 180 synergistically operates to prevent common issues that arise from improperly managed audio channels, such as missing or faint dialogue, poor audio balance, incorrect audio levels, delivery of the wrong language, or provision of an unintended audio service. Through the detailed analysis, layout optimization, language detection, and service recognition, the system significantly reduces the need for costly and time-consuming manual reprocessing of content, leading to more efficient operations and an enhanced viewer experience.

Overview

Figure 4:
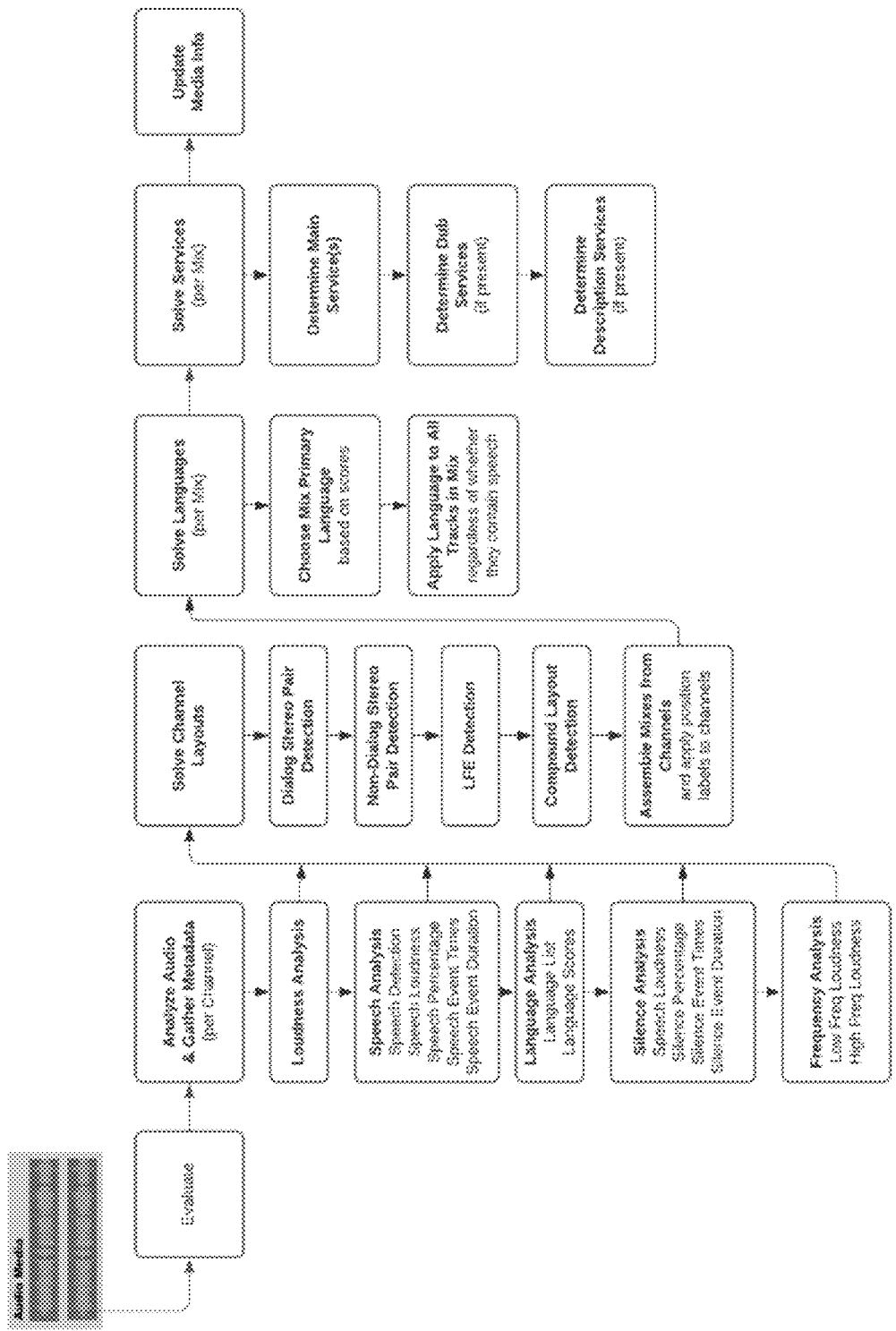
FIG. 4 shows a flowchart depicting channel layout evaluation, in accordance with one or more embodiments.

FIG. 4 shows a flowchart of a process for channel layout evaluation. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 4 should not be construed as limiting the scope of the invention. The steps of the process depicted by FIG. 4 are described in further detail in the forthcoming sections of the present disclosure, in accordance with various embodiments of the invention.

In one or more embodiments of the invention, as part of the metadata extraction phase, the channel detective service 180 identifies any channel layout discrepancies within the provided set of channels. This allows the system to detect any inconsistencies or irregularities in the channel configuration, which may arise due to mislabeling, incorrect organization, or other factors. By pinpointing such discrepancies early in the evaluation process, the service can take appropriate corrective measures to ensure the accurate identification and selection of channels for streaming.

Data Services

Figure 1C:
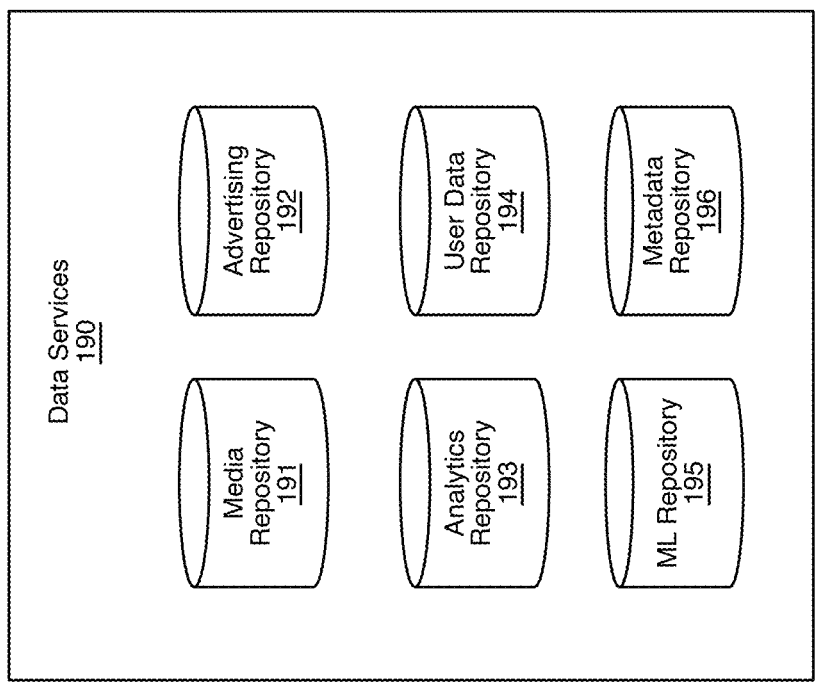

FIG. 1C shows a collection of data services 190, in accordance with one or more embodiments. As shown in FIG. 1C, the data services 190 include a media repository 191, an advertising repository 192, an analytics repository 193, a user data repository 194, a machine learning (ML) repository 195, and a metadata repository 196. Various components of the data services 190 can be located on the same device (e.g., a server, mainframe, virtual server in a cloud environment, and any other device) or can be located on separate devices connected by a network (e.g., a local area network (LAN), the Internet, a virtual private cloud, etc.). Those skilled in the art will appreciate that there can be more than one of each separate component/service running on a device, as well as any combination of these components/services within a given embodiment.

In one or more embodiments of the invention, each repository (191, 192, 193, 194, 195, 196) of data services 190 includes both business logic and/or storage functionality. For purposes of this disclosure, the terms "repository" and "store" may refer to a storage system, database, database management system (DBMS), or other storage related technology, including persistent or non-persistent data stores, in accordance with various embodiments of the invention.

In one or more embodiments of the invention, each repository includes both persistent and non-persistent storage systems, as well as application logic configured to enable performant storage, retrieval, and transformation of data to enable the functionality described herein. Non-persistent storage such as Redis, Memcached, and an in-memory data store can be utilized to cache data in order to increase performance of frequently accessed data and reduce the latency of requests.

In one or more embodiments of the invention, the media repository 191 includes functionality to store media items. Media items can include both source media items, advertising media items, and derived media items such as previews or clips, and can comprise media types and file formats of various types. Examples of media items can include, but are not limited to, movies, television shows, series, episodes, video episodes, podcasts, music, audiobooks, documentaries, concerts, live event recordings, news broadcasts, educational content, instructional videos, sports events, video blogs (vlogs), reality shows, animations, short films, trailers, behind-the-scenes footage, interviews, and user-generated content. Each of these media items can be stored, categorized, and retrieved in multiple formats such as MP4, AVI, WMV, MOV, MP3, WAV, FLAC, and others.

In one or more embodiments of the invention, the advertising repository 192 includes functionality to store advertising content. The advertising content may optionally correspond to a source media item in the media repository 191.

Advertising content within the repository can include various formats such as traditional commercial spots, interactive ads, sponsored content, banner ads, product placements, preroll and midroll video segments, overlay advertisements, branded graphics, and native advertising. These advertising formats can encompass a range of file types including, but not limited to, MPEG, MP4, AVI, MOV, GIF, PNG, JPEG, and HTML5 packages. The advertising repository 192 is engineered to categorize and manage these items based on metadata such as target demographics, content relevance, viewer preferences, engagement metrics, and advertising campaign parameters. In one or more embodiments of the invention, this enables the advertising service 140 to perform precise ad placement, ensuring that advertising content is appropriately matched to viewer profiles and media content types, thereby optimizing the advertising efficacy and viewer experience.

In one or more embodiments of the invention, the analytics repository 193 includes functionality to facilitate the functionality of the platform 100 by storing and organizing a wide array of analytics data relevant to the evaluation of channel layouts in digital media files. For example, the analytics repository 193 may be configured to store metadata produced during the audio analysis phase. The types of data stored in the analytics repository 193 can include, but are not limited to, metadata detailing audio loudness, speech detection, language identification, instances of silence, and frequency component analysis of each channel. For purposes of this disclosure, examples of metadata are frequently represented in Java Script Object Notation (JSON) format. It will be apparent to one of ordinary skill in the art that metadata could be stored as XML, text, database entries, or other forms. In one or more embodiments of the invention, the analytics repository 193 may serve not only as a structured store of data but also as a reference database that the channel detective service 180 utilizes to resolve issues with missing channel layouts, incorrect language labels, and unspecified audio service types. By accessing and interpreting this stored data, channel detective service 180 can be configured to algorithmically group channels into the appropriate mixes—such as stereo or 5.1 surround sound—and apply accurate labels for language and audio service types, thus ensuring the correct audio mix is delivered to the end-viewer.

In one or more embodiments of the invention, the user data repository 194 includes functionality to store user data. User data may include, but is not limited to, user preferences for audio channels, language selections, and desired service types, which can inform the automatic determination of channel layouts/mixes, languages, and service types for audio tracks. In one example, if a particular user frequently selects audio tracks with a "5.1 surround" layout in a specific language, the repository may store this preference data. Subsequently, channel detective service 180 leverages this information to prioritize analysis or delivery of similar layouts or languages when evaluating new content for that user, thus enhancing the personalization of the audio experience.

The data stored within this repository may range from simple user identifiers and associated channel layout preferences to more complex behavioral patterns, such as the frequency of changes between language selections or service types while consuming media. This data, potentially stored in formats such as JSON, XML, or relational databases, may also be utilized to enable the channel detective service 180 to refine its algorithms and improve its accuracy in auto-detecting and labeling audio tracks, thereby streamlining the content preparation process for delivery to the end-viewer and minimizing the costly need for manual reprocessing of audio mixes.

In one or more embodiments of the invention, the machine learning repository 195 is configured to function as a storehouse for machine learning models and associated datasets pertinent to the operation of channel detective service 180 and related services. This repository 195 includes functionality to retain and manage a diverse array of data types and structures used for training, validating, and deploying machine learning models that enhance media analysis capabilities. The repository 195 may be configured to store datasets comprising labeled audio samples that define channel attributes, spoken languages, audio service types, and more. These datasets may serve as training material for supervised learning models such as convolutional neural networks, recurrent neural networks, and more.

In one or more embodiments of the invention, in support of the channel detective service's 180 objectives, the machine learning repository 195 facilitates functions such as storing preprocessed and annotated media files used for model training, where each file is associated with metadata describing channel configuration, language, and service type. The machine learning repository 195 may be configured to store a variety of machine learning and related data, including but not limited to, model parameters, hyperparameters, and architecture configurations, logging performance metrics of models on validation sets to enable evaluation and comparison between different model iterations, and deployment packages that encapsulate trained models and inference code, ready to be deployed into the production environment.

In accordance with one or more embodiments of the invention, metadata repository 196 includes functionality to catalog, store, and facilitate access to a range of metadata. For example, the repository 196 may be configured to store JSON-formatted metadata outcomes from the media analysis process. The metadata may encompass a spectrum of media attributes including, but not limited to, channel loudness, dialog detection, language identification, silence intervals, and low-frequency content, all usable for determining channel layouts and service types, and a variety of other functions of the media platform 100.

Analysis and Metadata Gathering

In one or more embodiments of the invention, the metadata extraction engine 110 within the data pipeline 105 includes functionality to analyze media content and collect pertinent metadata. The metadata extraction engine 110 may be configured to interface with various services, including the channel detective service 180, to gather essential information about the audio content being processed. Through this analysis, the system extracts insights such as channel loudness, speech detection, language identification, silence detection, low-frequency channel detection, and linear time-code detection.

Figure 5:
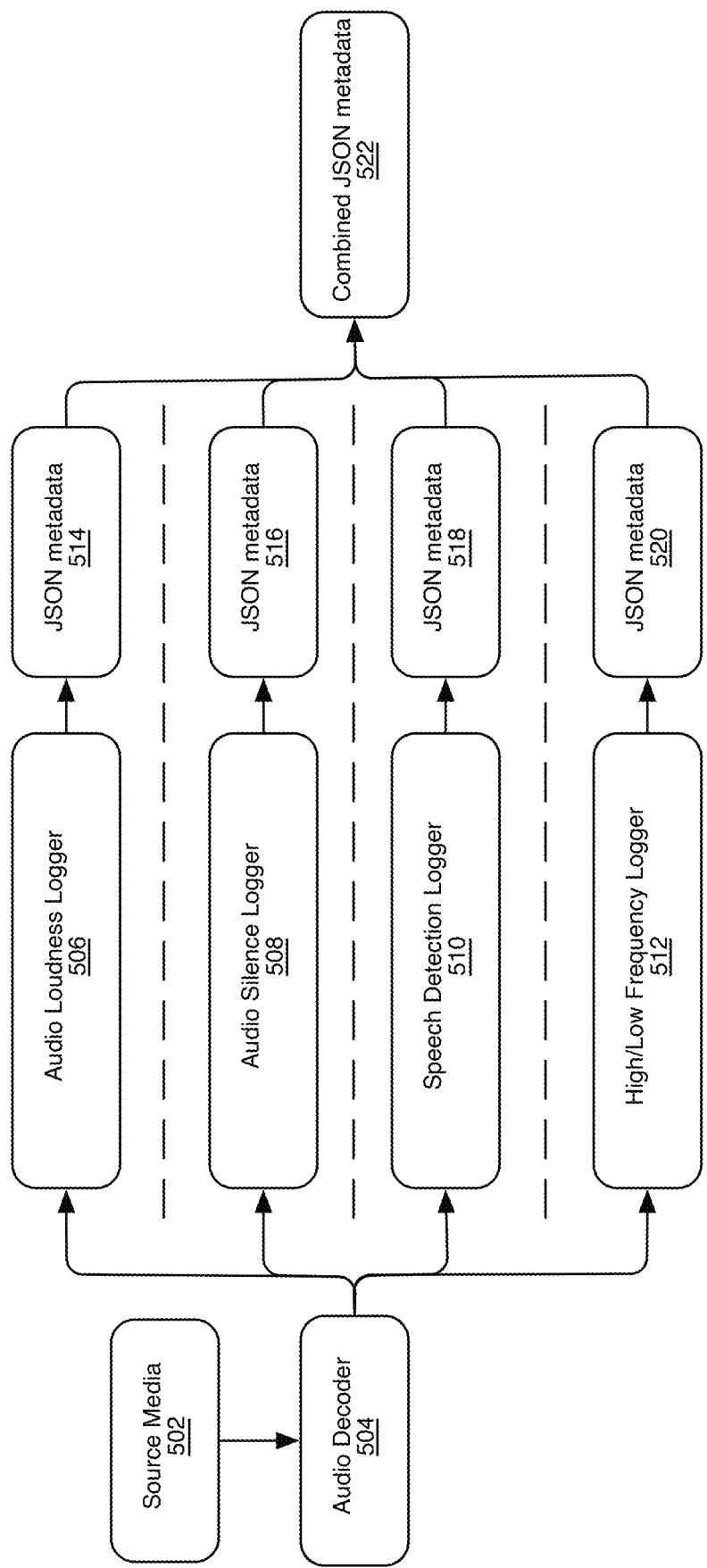
FIG. 5 shows a flowchart depicting metadata generation for a media item, in accordance with one or more embodiments.

FIG. 5 shows a flowchart of a pipeline for analysis and metadata gathering. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 5 should not be construed as limiting the scope of the invention.

In one or more embodiments of the invention, the metadata extraction engine 110 is implemented using a pipeline filter architecture. This architecture includes programmatic media processing pipelines comprising various software components. These components may include a source, decoder, and logger filters. By employing this architecture, metadata extraction engine 110 can efficiently analyze media content, extract metadata, and consolidate the results into a structured JSON format for further processing. In one or more embodiments of the invention, the resulting metadata representation(s) are stored in the metadata repository 196.

Each of the steps of the flowchart of FIG. 5 will now be described in the following sections of the disclosure using non-limiting examples and embodiments. This includes obtaining source media 502, performing audio decoding 504, performing audio loudness analysis 506, performing silence analysis 508, performing speech detection analysis 510, performing frequency analysis 512, generating metadata (514, 516, 518, 520), and generating combined metadata as output 522.

Metadata Types

In one or more embodiments of the invention, the data pipeline 105 is configured to collect various types of metadata to characterize audio channels comprehensively. The channel detective service 180 is configured to use this metadata to detect and infer the nature of the various components of audio content in order to provide the most optimal content delivery experience to client applications. The following subsections provide detailed descriptions of various metadata types analyzed by the data pipeline 105, including channel loudness, dialog detection, language detection, low-frequency channel detection, silence detection, and linear timecode detection. Each type of metadata contributes distinct insights into the audio content's characteristics, facilitating accurate channel mix determination and language identification.

Channel Loudness

In one or more embodiments of the invention, the metadata analysis engine 181 includes functionality to measure loudness of a channel to be used, for example, as a key metric for stereo pair identification and mix prioritization. This can include, average loudness, loudness of a collection of random or sampled timestamps of the channel, or any other method of determining loudness of at least a portion of the channel. In one example, utilizing a filter integrated into the pipeline for analysis and metadata gathering, the metadata analysis engine 181 calculates the root mean square (RMS) of audio samples in decibels relative to full scale (dBFS). Additionally, the metadata analysis engine 181 records timestamps for significant audio events such as the onset of non-silent samples and the occurrence of peak loudness. In one example, the measurement scale ranges from-infinity dBFS, indicating silence, to 0.0 dBFS, representing the loudest possible sound level achievable without distortion.

In another example, the metadata analysis engine 181 records the time instances of the first and last non-silent samples encountered within the audio channel. Continuing the example, the metadata analysis engine 181 additionally stores timestamps corresponding to the loudest peaks observed during the analysis. This metadata storage capability facilitates the synchronization of audio from different sources, enhancing interoperability in multi-source audio processing environments. This metadata enables precise synchronization of audio sources and aids in prioritizing channels based on their loudness contribution to the mix.

Dialog Detection

In one or more embodiments of the invention, the metadata analysis engine 181 employs dialog detection techniques to identify segments of audio containing speech. This can be crucial for understanding narrative content, for example. The metadata analysis engine 181 detects dialog events, quantifies dialog content as a percentage of total audio, and measures dialog loudness, in conjunction with other metadata extraction and inference techniques. This metadata may provide valuable insights into the prominence of dialog within channels, facilitating stereo pair identification and mix prioritization based on narrative significance.

In one example, the metadata analysis engine 181 identifies segments of audio within provided channels that contain speech, with each segment exceeding a duration threshold of 0.5 seconds. The metadata analysis engine 181 then performs aggregation and analysis of this information, including combining the small measurements of speech presence into continuous events, which may vary in duration. Furthermore, the metadata analysis engine 181 may compute additional statistics for later analysis, including the percentage of dialog content relative to all audio within the channel, as well as the loudness of the dialog. Upon detecting speech segments within audio channels, the metadata analysis engine 181 processes the information to generate comprehensive metadata. This metadata encompasses dialog events, including their start times and durations, as well as statistics such as the percentage of dialog content within the channel and the loudness of the dialog. Notably, in one or more embodiments of the invention, the metadata analysis engine 181 ensures that only segments containing dialog contribute to these measurements, thereby excluding non-dialog portions of the channel from the analysis.

Figure 6:
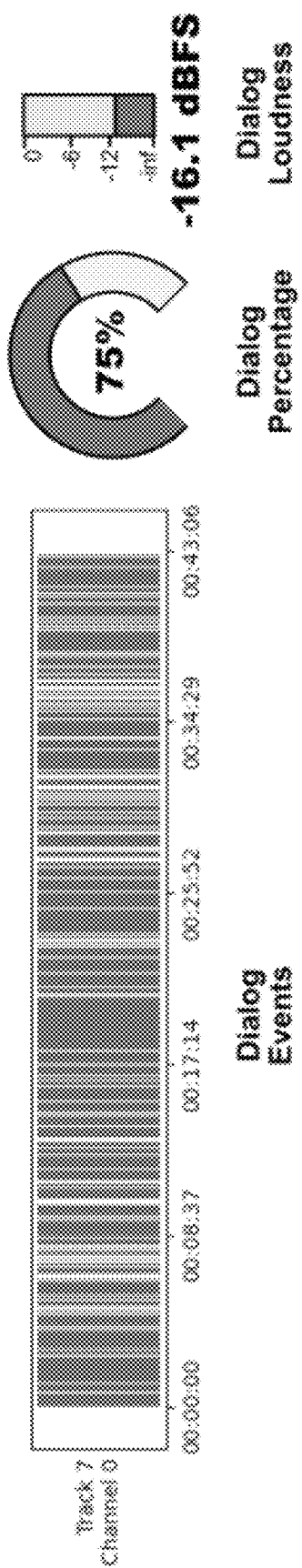
FIG. 6 depicts dialog events in a channel of a media item, in accordance with one or more embodiments.

In one or more embodiments of the invention, through the collection of metadata, the metadata analysis engine 181 creates a unique "dialog fingerprint" for each channel. This fingerprint serves as a distinctive identifier, enabling downstream processes to utilize the gathered information for tasks such as solving channel layouts and other audio processing tasks. FIG. 6 includes an exemplary visual depiction of dialog events in a channel ("track 7, channel 0"), dialog percentage, and dialog loudness.

Language Analysis

In one or more embodiments of the invention, the metadata analysis engine 181 utilizes language detection to identify unlabeled languages present in audio content, enabling multilingual service functionality. The metadata analysis engine 181 may be configured to optimize language detection efficiency by subclassing dialog detection filters and implementing intelligent sampling techniques. By scoring detected languages and employing contextual analysis, metadata analysis engine 181 accurately identifies primary languages within audio channels, enabling precise labeling for downstream processing.

In one or more embodiments of the invention, the metadata analysis engine 181 includes functionality to skip dialog and/or language analysis for segments of audio within channels that do not contain speech. Given that language analysis can be time and computationally intensive, this improves the speed and efficiency of the metadata generation process.

In one or more embodiments of the invention, the metadata analysis engine 181 integrates language detection seamlessly with dialog detection to increase processing effectiveness. In this way, by structuring the language detection filter as a subclass of the dialog detection filter, the metadata analysis engine 181 strategically avoids unnecessary language analysis on speech-devoid audio segments. This may serve to improve resource allocation, ensuring computational efforts are focused on pertinent audio data.

In one or more embodiments of the invention, the metadata analysis engine 181 enhances efficiency through a systematic subsampling strategy. Rather than analyzing entire audio streams continuously, the engine 181 intelligently selects intervals within extended durations for language analysis. For instance, in a 10-minute audio clip, the metadata analysis engine 181 may sample and analyze language patterns for 10-second (or other) segments at specific intervals. This method effectively balances computational resources while maintaining detection accuracy.

In one or more embodiments of the invention, the metadata analysis engine 181 employs adaptive termination criteria to optimize language detection processes. When a specific language is confidently identified in successive intervals, the metadata analysis engine 181 autonomously terminates further analysis for that language, thereby minimizing redundant computations. For example, if English is consistently detected with high confidence over multiple 10-second segments (e.g., at least a predefined number of times in a period of predefined duration), the analysis for English language may halt, conserving computational resources. However, in scenarios where multiple languages are present, the metadata analysis engine 181 extends its analysis to ensure thorough language identification. This adaptability ensures comprehensive language detection, enhancing the overall effectiveness of the process.

Furthermore, the metadata analysis engine 181 meticulously records identified languages along with their corresponding confidence scores. This comprehensive documentation facilitates detailed analysis and enables nuanced categorization of audio content based on language attributes. For instance, if a channel contains segments of both English and Spanish speech, the metadata analysis engine 181 records the presence of both languages along with their respective confidence scores, enabling precise categorization during subsequent processing stages.

Low Frequency Channel Detection

In one or more embodiments of the invention, the metadata analysis engine 181 employs low-frequency channel detection to identify the Low-Frequency Effects (LFE) channels, e.g., those responsible for bass-rich audio content. The metadata analysis engine 181 may be configured to distinguish LFE channels based on frequency band characteristics. This metadata aids in categorizing audio channels and facilitates accurate channel layout determination, particularly in surround sound configurations.

In one or more embodiments of the invention, the "LFE" (Low-Frequency Effects) channel is designated for conveying deep, low-frequency sounds such as rumbles and explosions. The metadata analysis engine 181 may employ crossover filtering techniques to discern unlabeled LFE channels. This may include a predefined frequency threshold (e.g., the channel contains no frequencies or minimal/predefined amount of frequencies above 300 Hz).

In one or more embodiments of the invention, the metadata analysis engine 181 splits an audio signal into two or more frequency bands and measures their respective loudness levels. The metadata analysis engine 181 further introduces further applications of the resulting metadata in subsequent stages of analysis. By examining the relationship between the loudness of frequencies below and above one or more thresholds, metadata analysis engine 181 distinguishes between LFE and non-LFE channels.

Figure 7A:
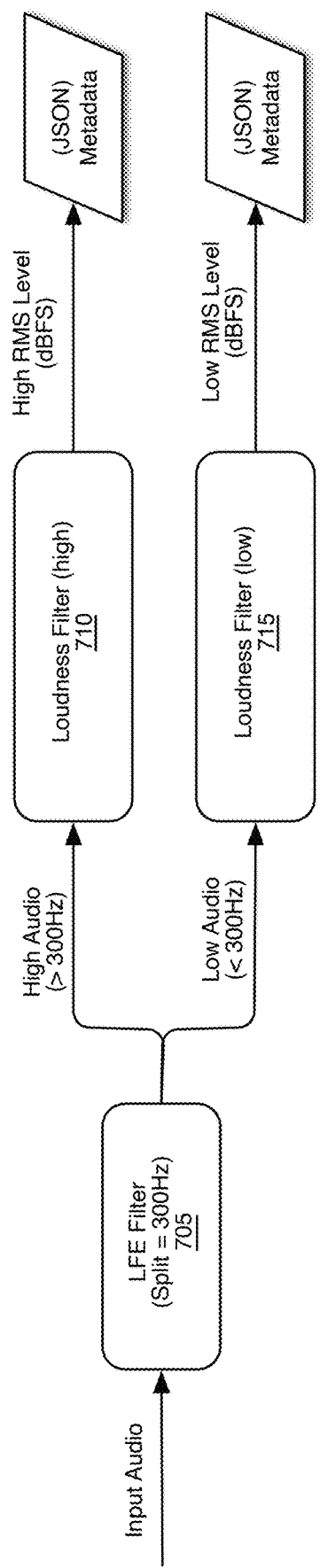
FIGS. 7A and 7B depict audio frequency analysis of a media item, in accordance with one or more embodiments.
Figure 7B:
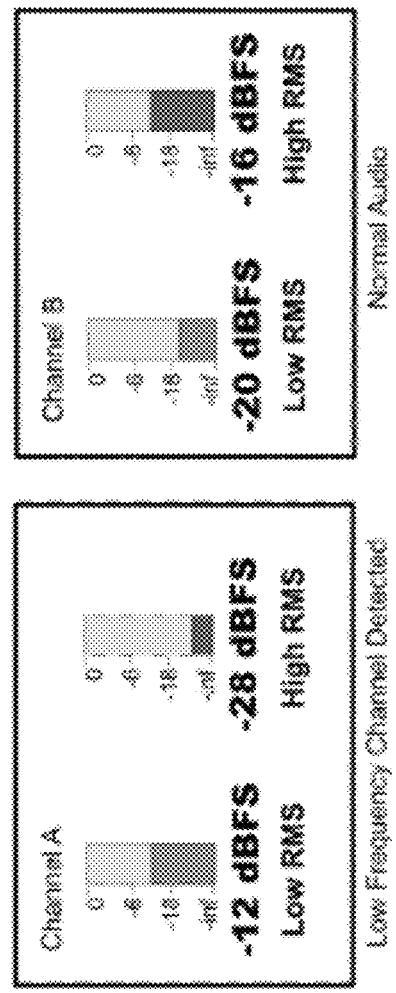

FIG. 7A depicts an example topology of the metadata analysis pipeline including a low frequency filter (705) and a loudness filter (710, 715). In the depicted topology, the audio signal is partitioned into distinct frequency bands, enabling separate analysis of low and high-frequency components. In this example, if the amplitude of the signal below 300 Hz exceeds that of the signal above 300 Hz, the metadata analysis engine 181 identifies the audio segment as likely originating from an LFE channel. Conversely, if the opposite scenario occurs, the metadata analysis engine 181 assumes the audio pertains to a non-LFE channel. This methodical approach ensures accurate differentiation between LFE and non-LFE channels within the audio content. FIG. 7B depicts a visual example of LFE channel and non-LFE channel ("Normal Audio") detection.

In one or more embodiments of the invention, the metadata analysis engine 181 includes functionality to utilize multiple frequency thresholds dependent on various criteria and/or characteristics of the source media item. For example, for an action-packed movie scene featuring explosions and deep rumblings, the metadata analysis engine 181 dynamically adjusts its frequency thresholds to accurately identify Low-Frequency Effects (LFE) channels. In this example, for this type of scene, the metadata analysis engine 181 lowers the frequency threshold to 100 Hz, targeting the robust bass frequencies characteristic of explosions and intense action sequences. Continuing the example, in a dialogue-heavy segment of a drama film, the metadata analysis engine 181 raises the frequency threshold to 200 Hz, prioritizing speech clarity and dialog prominence. This adjustment ensures that LFE channels containing background rumblings do not interfere with the intelligibility of the dialogue. In yet another example, in a music track categorized as bass-heavy electronic dance music (EDM), the metadata analysis engine 181 employs a frequency threshold of 80 Hz to capture the intricate basslines and sub-bass frequencies integral to the genre's sonic experience. This setting may improve the detection of LFE channels carrying impactful bass elements in the music. By dynamically adapting its frequency thresholds based on the specific characteristics of the audio content, the metadata analysis engine 181 may be configured to improve channel detection and ultimately improve the consumption experience for the end user(s).

Silence Detection

Figure 8:
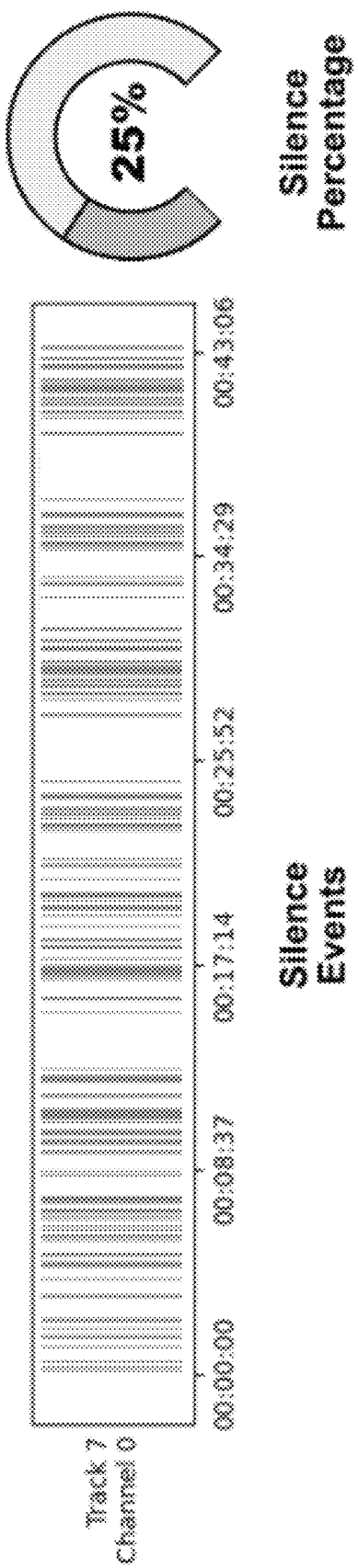
FIG. 8 depicts silence events in a channel of a media item, in accordance with one or more embodiments.

In one or more embodiments of the invention, the metadata analysis engine 181 incorporates silence detection capabilities to identify periods of audio inactivity within channels. The metadata analysis engine 181 may be configured to detect silence events, measure their durations, and/or compute the percentage of time one or more channels remain silent. This metadata enables the characterization of channel activity patterns and contributes to channel layout determination by identifying silent channels or segments. The metadata analysis engine 181 may be configured to collect silence metadata, including precise details such as start times and durations of silence events. For example, in a given audio file, the metadata analysis engine 181 may identify a silence event lasting 5 seconds starting at 00:03:20 and ending at 00:03:25. This level of specificity allows for accurate characterization and analysis of silence occurrences within the audio content. In another example, if a 10-minute audio clip contains a total of 2 minutes of silence, the metadata analysis engine 181 determines that the channel is silent for 20% of the time. This quantitative representation offers insights into the overall distribution of silent intervals within the audio content. FIG. 8 includes an exemplary visual depiction of silence events in a channel ("track 7, channel 0") and silence percentage.

In one or more embodiments of the invention, with this detailed silence metadata, the metadata analysis engine 181 generates a unique "silence fingerprint" for each channel. For instance, based on the distribution and characteristics of silence events, the metadata analysis engine 181 can distinguish between channels with sporadic or prolonged periods of silence. This fingerprint serves as a reliable identifier for channel layout/mix solutions, enabling precise grouping and organization of audio channels. The channel detective service 180 may be configured to perform improved channel detection based on matching of fingerprint types or archetypes in subsequent processing of the media file.

Linear Timecode Detection

Figure 9:
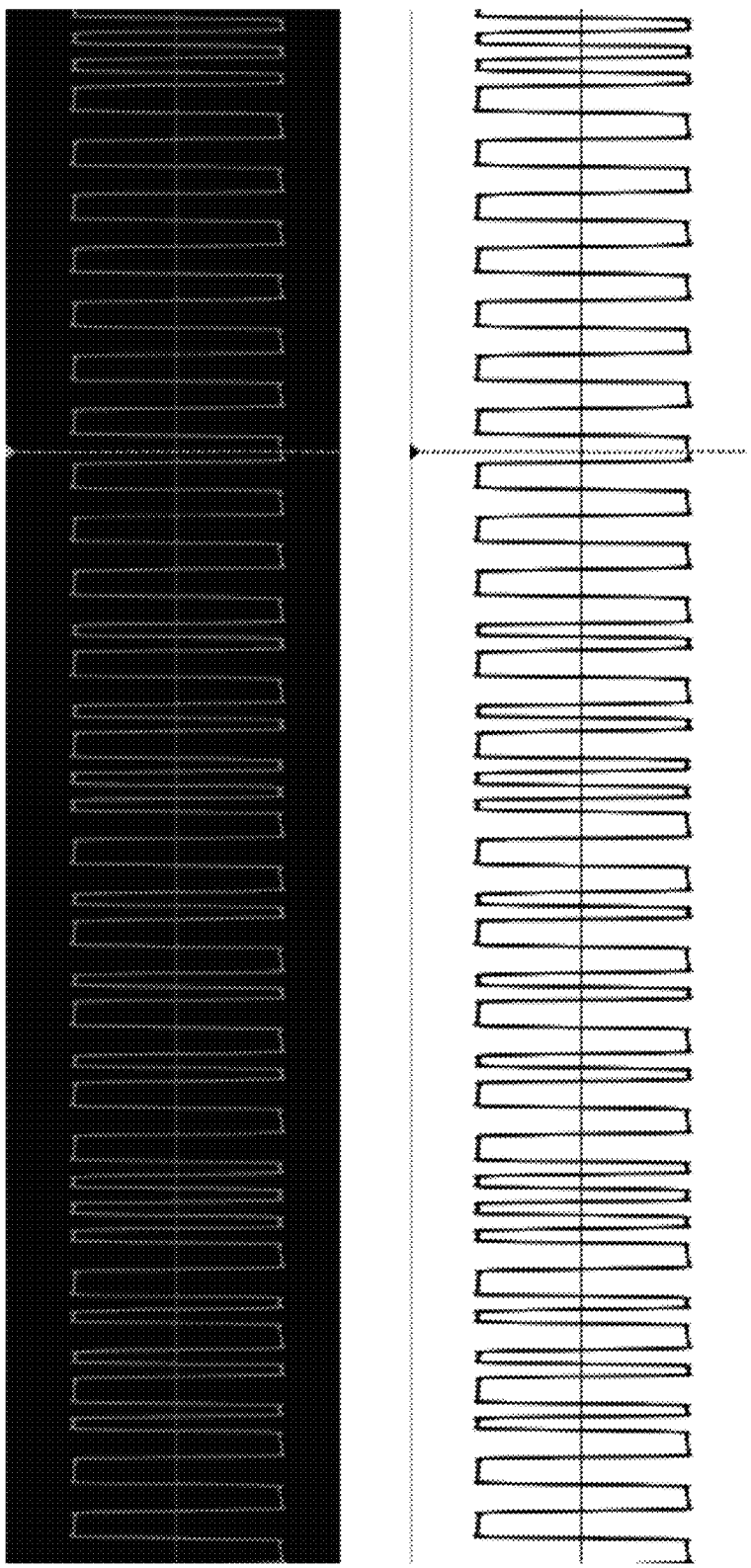
FIG. 9 depicts linear timecode detection of a media item, in accordance with one or more embodiments.

In one or more embodiments of the invention, the channel detective service 180, specifically the metadata analysis engine 181, is configured to detect the presence of Linear Timecode (LTC) within an audio channel of digital media content. LTC is typically embedded by content partners as a method for encoding time information within an audio signal, manifesting as a square wave pattern that can be decoded to reveal precise timecode data. FIG. 9 depicts an example of a timecode, illustrating the square wave pattern. The channel detective service 180 may be configured to utilize a specialized filter in the detection of LTC. The filter, in one embodiment of the invention, is configured to analyze the audio waveform for characteristics indicative of LTC. This analysis focuses on counting the occurrences of zero crossings within the audio signal, which are points where the waveform intersects the vertical centerline of its graphical representation. Unlike regular audio content, which may exhibit a higher frequency of zero crossings due to its complex waveform, a data-generated square wave, such as that of LTC, features significantly fewer zero crossings, providing a distinct pattern that can be algorithmically identified.

In one or more embodiments of the invention, upon successful detection of LTC within an audio channel, the channel detective service 180 marks the channel accordingly, ensuring it is flagged to prevent its unintended inclusion in the final audio mix delivered to end-viewers. This functionality is critical for maintaining the integrity of the audio experience, as the inclusion of LTC in an audio mix could, in some cases, disrupt the auditory presentation with non-musical, time-encoded signals.

In one or more embodiments of the invention, the channel detective service 180, through the metadata analysis engine 181, may incorporate advanced signal processing techniques to enhance the detection and interpretation of Linear Timecode (LTC). In one embodiment, the service may implement a machine learning model trained on a diverse dataset of audio signals, both with and without LTC, to improve the accuracy of LTC detection beyond the analysis of zero crossings. The model would be designed to recognize the specific waveform characteristics of LTC in various audio conditions, potentially including audio artifacts that could obscure the LTC signal.

Additionally, in another embodiment, upon the detection of LTC, the metadata analysis engine 181 is configured to automatically extract and convert the LTC to a human-readable format, such as HH:MM:SS:FF (hours, minutes, seconds, frames), and embed this data into the metadata of the digital media file. This innovation may, in some scenarios, obviate the need for external timecode conversion tools, streamlining the post-production workflow by providing immediate, in-context access to precise timing information. The metadata analysis engine 181 may comprise an integrated decoder capable of directly interpreting the square wave signals characteristic of LTC and extracting the embedded timecode data. The process involves algorithmically converting the frequency and amplitude of the zero crossings into standard timecode information, which is subsequently translated into a readable format such as hours, minutes, seconds, and frames.

In one or more embodiments of the invention, the metadata analysis engine 181 includes an annotation feature whereby the detected LTC metadata and its resolved timestamp can be annotated and exported as part of the metadata package. This feature may provide additional utility in collaborative environments, where multiple stakeholders may benefit from access to resolved timecode data for review, logging, or subsequent processing stages.

Channel Layout Resolution

In one or more embodiments of the invention, the channel detective service 180 includes functionality to solve for unknown channel layouts utilizing the generated metadata. In one embodiment, the original audio data is no longer accessed at this stage, showcasing the efficiency and efficacy of the system's design in streamlining subsequent processes.

Stereo Pair Detection

Stereo pairs consist of two channels that, in some configurations, synergistically produce a coherent sound field, each channel contributing to a 'phantom center' perceived by the listener.

In one or more embodiments of the invention, it may be deemed that using a phase cancellation method to detect stereo pairs is too computationally intensive or otherwise not desired/optimal, especially with an increasing number of channels. The channel detective service 180, by leveraging metadata, may be configured to identify stereo pairs more rapidly and/or accurately without the need for such intensive processing. In one or more embodiments of the invention, the channel detective service 180 also distinguishes between stereo pairs containing dialog and those that do not, recognizing and annotating their unique relevance to various audio mixes.

Figure 10A:
FIGS. 10A and 10B depict stereo pair metadata analysis of a media item, in accordance with one or more embodiments.

FIG. 10A depicts an exemplary visual representation of a matching stereo pair identified through the comparison and manipulation of previously gathered metadata. As shown in FIG. 10A, the matched stereo pair includes similar, though not identical, characteristics for each channel within the pair (Channel A and Channel B).

Figure 10B:

FIG. 10B depicts an exemplary visual representation of two channels determined to be unrelated through the comparison and manipulation of previously gathered metadata. As shown in FIG. 10B, the unmatched channels include differences in dialog percentage, silence percentage, and other characteristics that exceed one or more thresholds identified by the channel detective service 180.

In one or more embodiments of the invention, the channel detective service 180 analyzes potential stereo pairs by comparing the metadata of successive channels, accounting for channel layouts that may intersperse other channels amongst stereophonic pairs (e.g., Left-Center-Right layouts). The channel detective service 180 may assess channel metadata against multiple criteria to determine if two channels constitute a stereo pair. Examples of such criteria include, but are not limited to, a loudness match within ±5 dBFS for channel balance, the absence of low-frequency effect channel identification in either channel, similar dialog percentages within a 10% margin, comparable dialog event patterns, and comparable silence event patterns. These criteria may increase the likelihood that stereo pairs are detected with high fidelity, conforming to established auditory standards.

Figure 11:
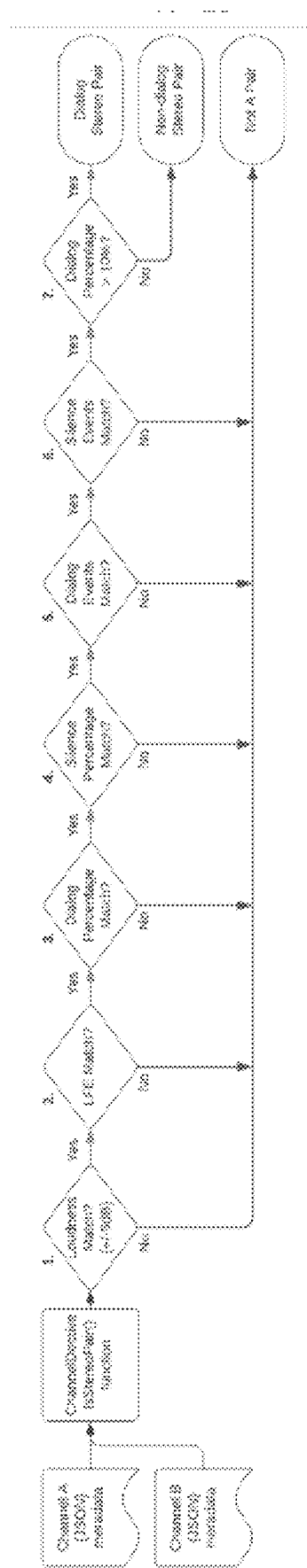
FIG. 11 shows a flowchart depicting stereo pair analysis of a media item, in accordance with one or more embodiments.

FIG. 11 shows a flowchart of a process for determining if two channels constitute a stereo pair ("isStereoPair") based on their corresponding JSON metadata. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 11 should not be construed as limiting the scope of the invention.

As described in FIG. 11, the process includes a loudness matching process, an LFE matching process, a dialog percentage matching process, a silence percentage matching process, a dialog events matching process, a silence events matching process, and a final dialog percentage threshold (e.g., at least 10% dialog in both channels), which are utilized collectively to determine if the channels are a matching stereo pair. In one or more embodiments of the invention, the channel detective service 180 includes functionality to perform one or more of the following processes for matching of stereo (or other) channel groups:

Loudness Matching Process: In one or more embodiments of the invention, the channel detective service 180 includes functionality to compare the average loudness levels of audio channels. For example, by employing a loudness filter, the service 180 may calculate the Root Mean Square (RMS) loudness for each channel, allowing for the identification of potential stereo pairs or groups based on their loudness similarity. In one embodiment, channels with an average loudness discrepancy of less than 3 dBFS are preliminarily considered as candidates for matching, given their similar auditory impact. For example, if Channel A has an average loudness of −20 dBFS and Channel B of −22 dBFS, their similarity in loudness levels (within +−3 dBFS) may result in the service 180 marking them as potential matching candidates.

LFE Matching Process: In one or more embodiments of the invention, the channel detective service 180 includes functionality to identify channels serving as Low-Frequency Effects (LFE) channels by examining their frequency content. For example, channels predominantly featuring frequencies below 300 Hz are tagged as LFE. The identification may be based on the premise that LFE channels should contain minimal to no content above this threshold, distinguishing them from full-spectrum audio channels. In one example, a channel with 85% of its energy in frequencies below 300 Hz is classified as an LFE channel, aligning with its role in delivering deep, impactful sounds.

Dialog Percentage Matching Process: In one or more embodiments of the invention, the channel detective service 180 includes functionality to quantify the percentage of dialog within each channel. In one embodiment, channels primarily containing speech are vital for narrative purposes and are thus prioritized in the matching process. A threshold for dialog content may be set to distinguish channels predominantly used for dialog from those carrying background music or effects. In one example, channels with dialog percentages exceeding 50% are identified as primary narrative channels, indicating their importance in the audio mix.

Silence Percentage Matching Process: In one or more embodiments of the invention, the channel detective service 180 includes functionality to assess silence within channels to identify tracks with minimal audio content, which may not be necessary for the primary audio mix. By measuring the duration of silence relative to the total duration, channels with excessive silence may be flagged by the service 180 for potential exclusion and/or for use in special contexts. In one example, a channel that exhibits more than 70% silence might be deemed unnecessary for the main mix, potentially earmarked as a secondary or auxiliary track.

Dialog Events Matching Process: In one or more embodiments of the invention, the channel detective service 180 includes functionality to analyze dialog events and to compare the distribution and frequency of such events across channels. Similar patterns in dialog events suggest that the channels function in concert, either as stereo pairs or as part of a cohesive multi-channel setup. In one example, two channels that share a closely aligned pattern of dialog events, such as a quantity/percentage of occurrences of simultaneous speech followed by synchronous silence, are considered by the service 180 for pairing due to their mirrored content structure.

Silence Events Matching Process: In one or more embodiments of the invention, the channel detective service 180 includes functionality to analyze periods of silence within the audio tracks. The service 180 may be configured to match silence patterns across channels, which can indicate a designed silence or pauses meant to enhance the auditory experience, thus serving as another criterion for matching channels. In one example, channels that exhibit synchronized periods of silence, interspersed with audio content, may be matched as they suggest a structured audio experience designed to be heard across multiple channels.

Final Dialog Percentage Threshold: In one or more embodiments of the invention, the channel detective service 180 includes functionality to establish a minimum dialog content threshold to ensure that matched channels contribute meaningfully to the viewer's auditory experience. In one embodiment, channels must meet or exceed this dialog percentage threshold to be considered a matching pair, emphasizing the importance of narrative content in the audio mix. In one example, only channels with at least 10% dialog content are eligible for matching, ensuring that each channel plays a significant role in delivering the narrative.

Additional Non-Audio Detection: In one or more embodiments of the invention, the channel detective service 180 includes functionality to analyze the frequency of zero crossings to identify channels that may carry non-audio signals, such as data-generated square waves, differentiating them from genuine audio content. This process may aid in excluding non-relevant channels from the matching process, focusing on channels with authentic audio content. In one example, a channel with infrequent zero crossings, characteristic of a data-generated square wave, is flagged and excluded from the matching process, ensuring that only genuine audio content is considered for channel pairing.

Event Comparison Technique

In one or more embodiments of the invention, the channel detective service (180) includes functionality to execute one or more event comparison techniques by comparing metadata event arrays from two distinct audio channels. This technique may be utilized when determining the similarity of audio channels for the purpose of identifying matching stereo pairs or other related audio configurations.

The event comparison technique may involve the application of set-theoretic operations to timed metadata events derived from the audio analysis. In one example, the channel detective service (180) implements 'intersect( )' and 'union( )' functions corresponding to the set theory union (∪) and intersection (∩) operations for event metadata.

Union Operation (union( )): This function may be implemented to combine the timed events from two channel arrays, creating a comprehensive set that includes all unique events from both channels.

Intersection Operation (intersect( )): This function may be implemented to identify overlapping events present in both channel arrays, yielding a set of timed events common to both channels.

Figure 12:
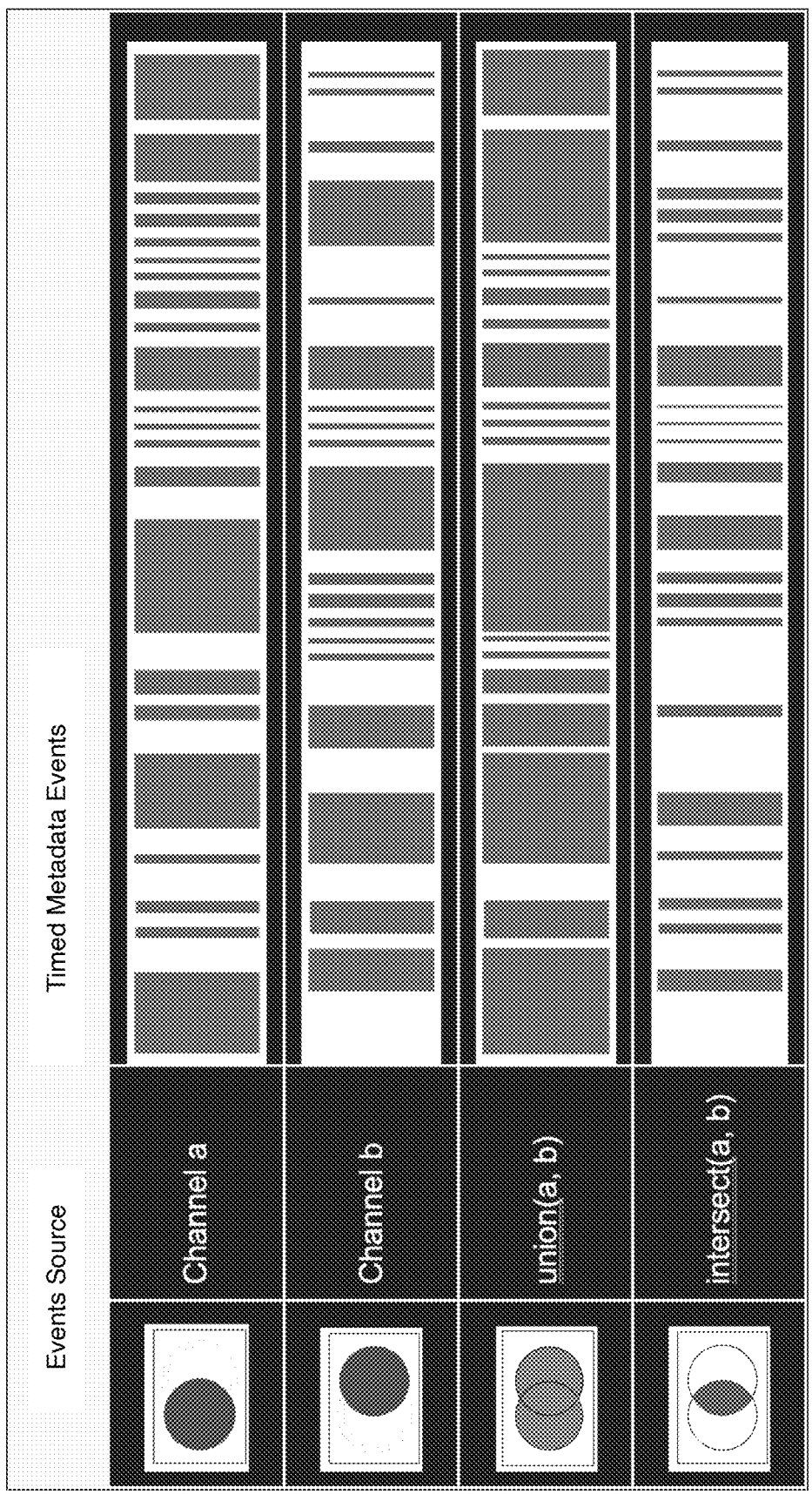
FIG. 12 is a depiction of channel event comparison, in accordance with one or more embodiments.

FIG. 12 depicts a visual illustration of the union and intersection of two exemplary channels ("Channel a" and "Channel b").

Quantitative Matching Criteria: In one or more embodiments of the invention, to assess the similarity of two audio channels, the channel detective service (180) may be configured to quantify the events by summing the durations of the intersecting and unionized metadata events. A comparison of these sums determines if the channels match according to predefined thresholds, which account for expected similarities and allowable differences between channels. In one example, for silence events, the threshold is set at 0.6 (60%). In this example, two channels are considered to match silence events if the total time of intersecting silence events is at least 60% of the total time of combined silence events from both channels. In another example, for dialog events, the threshold is set to 0.8 (80%), reflecting the potential higher importance of dialog synchronization in matched audio channels.

Example Algorithm Implementation: The following pseudocode exemplifies the evaluation of dialog events matching: boolean dialog_match=time_sum(intersect(a, b))>=0.8*time_sum(union(a, b))

Here, 'time_sum( )' calculates the total duration of events, 'intersect(a, b)' refers to the intersection of events from channels a and b, and 'union(a, b)' refers to the union of events from channels a and b. The channels are considered a match if the condition evaluates to true.

In one or more embodiments of the invention, the channel detective service (180) includes functionality to incorporate machine learning algorithms into the event comparison technique to adaptively modify threshold values for event comparison based on the content type being analyzed. This extension may allow for a more nuanced analysis of audio events, enhancing the system's accuracy and efficiency in matching channels across varied audio environments. For example, the service 180 may apply a machine learning model trained on a vast dataset of audio files to distinguish between different types of audio content. The model analyzes the spectral and temporal characteristics of audio to classify it as music, speech, or environmental sounds. Based on the classification outcome, the service 180 adjusts the intersect and union threshold multipliers accordingly. For speech-dominated content, where precise synchronization of dialog is imperative, the service 180 may set a higher threshold multiplier, such as 0.9, to ensure that only channels with closely matching dialog events are paired. Conversely, for content rich in environmental sounds, where exact event matching is less critical, the service 180 may employ a lower threshold multiplier, such as 0.7, allowing for a broader range of acceptable matches and accounting for the natural variability in such audio content. Additionally, for music, where rhythm and beat patterns are crucial, the system could implement a rhythmic analysis module within the machine learning algorithm to set threshold multipliers that best reflect the periodicity and tempo of the music tracks being analyzed. For example, the multiplier may be set to 0.85 for channels within a musical piece to ensure rhythmic elements are aligned.

Dialog

In one or more embodiments of the invention, the channel detective service (180) includes functionality to evaluate dialog within audio mixes, particularly addressing scenarios where multiple dialog channels are present within an audio track or mix.

According to one embodiment of the invention, dialog channels lacking a corresponding stereo mate as delineated in prior sections are potential candidates for Front-Center mono channels. This assessment is crucial for accurate channel layout in mono or surround sound configurations, where the clarity and directionality of dialog are paramount.

In one or more embodiments of the invention, in cases where multiple dialog channels coexist within a track or mix, the channel detective service (180) computes a dialog score for each channel. The dialog score metric serves as an aggregate representation of the dialog prominence within a channel, combining dialog loudness, dialog percentage, and/or other dialog-related metrics.

In one embodiment, the computation of the dialog score for each channel is expressed by the formula: Dialog Score=[(120+dialog_rms)/120]*dialog_percentage Here, dialog_rms represents the loudness of the dialog within the channel measured in decibels, full scale (dBFS), which typically presents as a negative value. By adding 120 to dialog_rms, the formula transforms dBFS into a positive figure less than 120. This result is then divided by 120 and multiplied by the dialog percentage to yield a score ranging from 0.0 to 100.0, thus facilitating the comparison of dialog importance across channels.

For example, given a channel with a dialog_rms of −30 dBFS and a dialog percentage of 50%, the dialog score would be computed as follows: [(120+dialog_rms)/120]*dialog_percentage=[(120−30)/120]*50=37.5

In one or more embodiments of the invention, the channel detective service (180) includes functionality to prioritize channels exhibiting higher dialog scores in the process of resolving channel layouts, supporting the system's selection of the most narratively significant channels.

In scenarios where a mix presents dialog across a stereo pair, resulting in a "phantom center," the individual channels may demonstrate lower dialog scores compared to a single mono dialog channel. To address this, in one or more embodiments of the invention, the service 180 implements a process which amalgamates the metadata of multiple channels to produce a unified dialog score. This unified score effectively simulates a consolidated dialog channel, reflecting the collective dialog presence in the stereo pair and resolving potential discrepancies in comparison to singular dialog channels or channels within different mixes. In one example, if a stereo pair has individual dialog scores of 25 for the left channel and 30 for the right channel, the service 180 might calculate a combined dialog score that appropriately reflects the sum total of dialog presence, in this case 55, thereby ensuring an equitable comparison with other channel configurations.

Matching Channels to Standard Layouts

In one or more embodiments of the invention, the channel detective service 180 performs layout detection using a generated metadata representation. This process may involve the execution of a sophisticated similarity model, specifically configured to analyze the metadata and identify patterns among the provided channels. Leveraging techniques such as event detection, dialog analysis, and audio configuration analysis, the similarity model discerns commonalities and relationships among the channels, facilitating the creation of mix groups for subsequent processing and streaming.

In one or more embodiments of the invention, the layout engine 182 includes functionality to align identified audio channels to standard audio layouts. This may optionally be performed following the detection and evaluation of audio channel metadata for dialog, non-dialog stereo pairs, single dialog channels, and/or LFE channels. The layout engine 182 may be configured to match identified channels to a database of known or retrieved standard layouts, effectively "slotting" each channel into a layout or mix based on one or more characteristics of the layout. In one embodiment of the invention, should the channels not conform to a standard layout, the engine 182 will cease operations on the media file, and signal the necessity for manual intervention by content processing personnel.

In one or more embodiments of the invention, the layout engine 182 begins the process of standard layout resolution with an evaluation of the input channel count to determine applicable standard layouts. For instance, if only three channels are detected, the engine 182 will not evaluate against six-channel layout standards. In one example, the engine 182 will assess a three-channel input against possible layouts such as 2.1 and 3.0 but not against a 5.1 or 7.1 layout.

Figure 13:
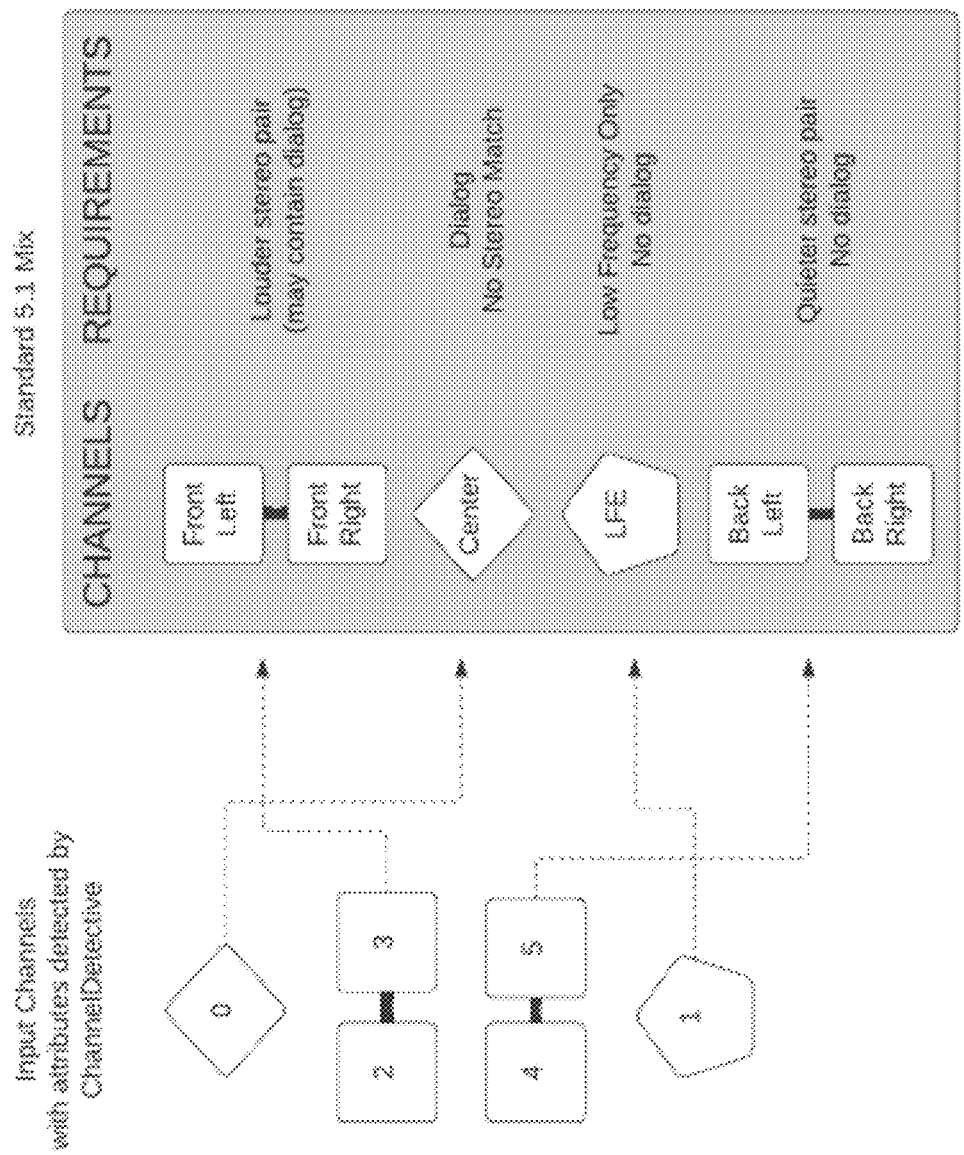
FIG. 13 is a depiction of a process for input channel mix selection, in accordance with one or more embodiments.

FIG. 13 depicts an illustrative exemplary mapping of input channels with attributes detected by the channel detective service 180 to a standard 5.1 channel layout. As shown in the figure, the input channels may be mapped to specific channels of the layout based on criteria such as loudness/stereo pair detection, dialog analysis, LFE analysis, and more.

FIG. 14 depicts a table illustrating a set of possible layouts corresponding to channel count. As illustrated, for each channel count, the layout engine 182 may be configured to consider various potential layouts. The engine 182 uses a set of criteria and heuristics to identify the most suitable channel layout.

In one or more embodiments of the invention, the layout engine 182 includes functionality to further assess tracks that may encompass more than one standard layout, aiming to deconstruct them into simpler layouts with fewer channels. This is particularly relevant for input channel counts exceeding standard layouts, where compound layouts are presumed. In a non-limiting example, in the instance of an eight-channel input, the engine 182 may:

Initially, attempt to resolve a 5.1 layout from six channels that would be common to both a 7.1 and a 5.1+Downmix.

Validate if the remaining two channels form a stereo pair and assess them for dialog content.

If substantial dialog is detected that mirrors the Center channel's dialog characteristics in the previously identified 5.1 layout, it is deduced to be an additional compound mix. Conversely, if minimal or no dialog (not meeting a defined threshold) is found, these channels are assimilated into the 5.1 layout to complete a 7.1 configuration.

The methodology shown in this non-limiting example enables the layout engine 182 to discern between a pure 7.1 layout and a compound 5.1+Downmix layout based on dialog presence and channel correlation, enhancing the system's channel matching precision.

Language Resolution

In one or more embodiments of the invention, within the layout detection phase, the channel detective service 180 executes several key sub-functionalities to annotate the mix group effectively. This includes annotating the primary language of the mix group by aggregating language inferences from the metadata representation corresponding to channels in the mix group. By accurately annotating the primary language, the service ensures that subsequent streaming aligns with viewer preferences and language requirements.

In one or more embodiments of the invention, the language engine 183 includes functionality to resolve and designate a primary language to audio mixes. In one embodiment, this is performed after the channel layouts have been established. The language engine 183 may be configured to differentiate and tag identical channel layouts within different language mixes accordingly with their corresponding languages.

In one or more embodiments of the invention, the language engine 183 includes functionality to analyze and identify multilingual audio content. In today's globalized media landscape, content is often accompanied by audio channels in various languages. The language engine 183 can identify and categorize these channels, even when they are not labeled, using audio recognition algorithms that detect language-specific attributes. For example, language engine 183 may be configured to distinguish a Spanish dialogue track from an English one based on linguistic acoustic patterns, despite the absence of metadata labels, thus enabling the correct language track to be included in the final mix according to viewer preferences.

In one or more embodiments of the invention, when audio tracks contain multilingual content, the language engine 183 includes functionality to determine the primary language of the track through a voting mechanism. This engine 183 evaluates each detected language instance, assigning "votes" based on any number of metrics, including but not limited to: the confidence level of language identification and the frequency of occurrence within the track. In one example, a track containing 70% English with a confidence score of 0.8 and 30% Spanish with a confidence score of 0.9 would accumulate higher "votes" for English due to its dominance in the content, despite the higher confidence for Spanish.

In one or more embodiments of the invention, upon establishing the primary language via voting, the language engine 183 attributes the language across all tracks within the mix. This may ensure uniform language labeling for the mix and facilitate the coherence of downstream processes such as transcoding and packaging.

In one or more embodiments of the invention, the language engine 183 processing logic for final language determination on a track operates as follows:

1. Inspect the channel with the highest dialog percentage within the mix. If the associated language score is at or above a predetermined threshold (e.g., 0.8), this language is designated as the primary language for the mix.
2. Should the first condition not be met, the channel with the highest language score is examined. If this score meets or exceeds a higher threshold (e.g., 0.9), its language is selected as the primary language for the mix.
3. In the event that neither condition is satisfied, the language which represents the majority (e.g., over 50%) based on the voting ratio is adopted as the track's language.

A non-limiting example of language resolution by the language engine 183: If the channel with the highest dialog percentage has an English language score of 0.75, and another channel with a lower dialog percentage has an English language score of 0.95, the system will prioritize the second channel's higher score and designate English as the primary language for the mix.

Service Type Resolution

In one or more embodiments of the invention, the channel detective service 180 further annotates a service type for the mix group based on various factors, including channel subsets, primary language annotation, and comparison with other mix groups of the media item. This involves categorizing the mix group based on its intended service type, such as main audio, dubbing, or audio description for the visually impaired. By assigning appropriate service types, the service 180 enables tailored audio experiences, accommodating diverse preferences and accessibility needs.

In one or more embodiments of the invention, the service engine 184 includes functionality to recognize and handle channels dedicated to special services such as audio description for visually impaired audiences. This engine 184 employs sophisticated audio analysis to detect the characteristic features of such service-oriented tracks, including specific frequency patterns or the presence of a narrated description of visual elements. As a result, in one embodiment, the service engine 184 ensures that these valuable services are preserved in the appropriate final mix, delivering an inclusive media experience to all viewers. For example, the service engine 184 can be configured to integrate the audio description track into the final mix without disrupting the overall audio balance, ensuring that visually impaired viewers receive the intended additional narrative.

In one or more embodiments of the invention, the service engine 184 includes functionality to determine and categorize service types through the analysis of audio tracks' characteristics and metadata. As described, these service types can include, but are not limited to, main, dub, and description services. The service engine 184 may be configured to classify the primary audio track in the primary language as the main service. In one embodiment of the invention, each piece of content must possess a main service. If a single mix is present within the content, it is automatically tagged as main. In one embodiment of the invention, for content containing multiple mixes, the system identifies the first mix (inclusive of track 0) as the main service, assigning it the role of the primary language audio track. Furthermore, the system supports multiple main service mixes, provided they feature distinct channel configurations, such as surround and stereo versions. The service engine 184 employs the output of the layout engine 182 to evaluate additional mixes without unique channel layouts, determining their potential classification under other service types, like description services.

In one or more embodiments of the invention, the language engine 183 is responsible for identifying any mix in a language other than that of the main service's primary language, which the service engine 184 labels as a dub service. This allows for the inclusion of multiple dub services for different languages. The system's design accounts for encountering description tracks in secondary languages, by tagging them appropriately as description services, following predefined criteria.

In one or more embodiments of the invention, the service engine 184 includes functionality to identify description services, which include narration describing on-screen action in addition to the primary audio components (such as music, dialog, and sound effects). The metadata analysis engine 181 leverages metadata event union and intersection functions for this purpose. In one example, a mix qualifies as a description service if the dialog events' intersection with the Main mix exceeds 90% (a predefined or dynamic threshold), and the mix contains at least 30% (a predefined or dynamic threshold) more dialog than the main mix. In this example, this is determined using comparison metrics derived from the union and intersection of metadata event arrays from the relevant mixes. Continuing this example, the following process is performed:

For identifying the main service, the system assumes the first audio mix (containing track 0) as the primary mix, regardless of the total number of mixes present.

In the case of dub services, all mixes in languages different from the primary language of the main service are classified accordingly. The system is adaptable to account for secondary language description tracks.

In one or more embodiments of the invention, the service engine 184 includes functionality to identify description services through a detailed analysis. For example, if a mix is mono, the engine 184 uses the events from that single channel for comparison. For stereo mixes, the system creates a union of metadata event arrays from the left and right channels. Surround mixes involve a union of events from the front right, front left, and front center channels. The decision to tag a mix as a description service hinges on a detailed analysis comparing these events with those of the main mix, applying specific thresholds for dialog event intersection and additional dialog content.

Figure 15:
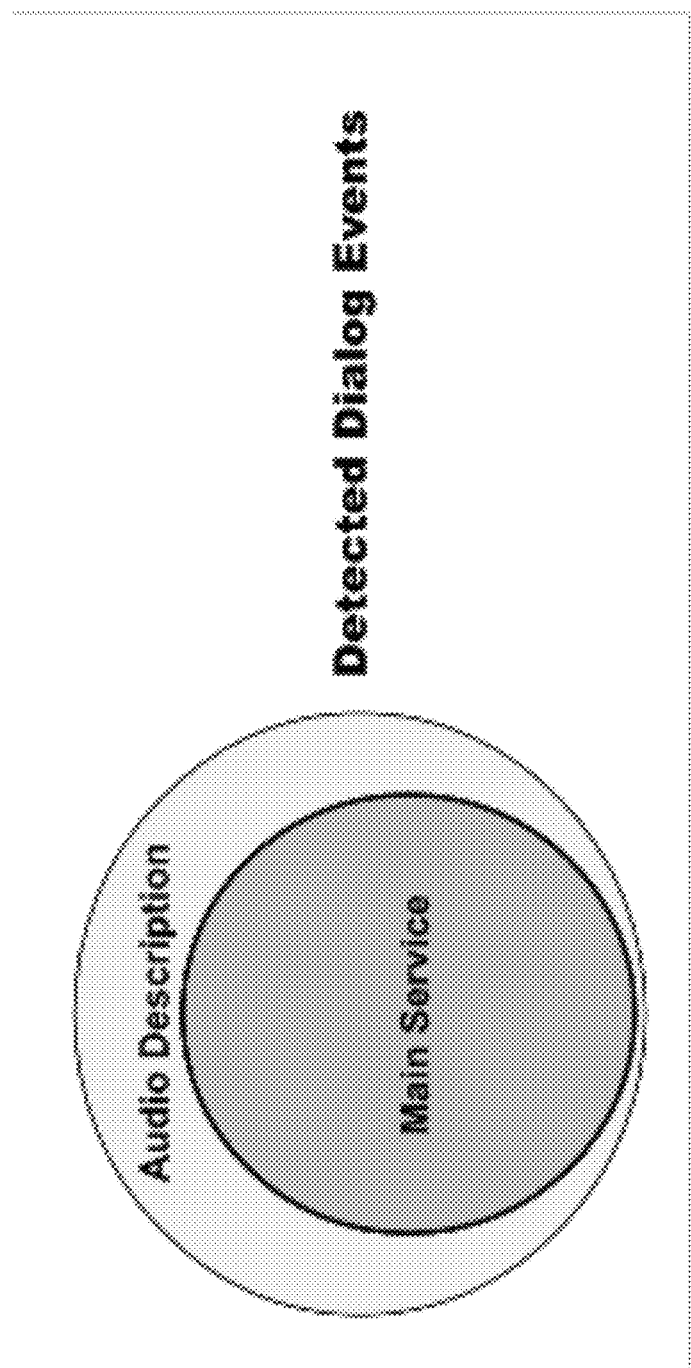
FIG. 15 is a Venn diagram depicting dialog events in a description mix and a main mix of a media item, in accordance with one or more embodiments.

FIG. 15 is a Venn diagram depicting detected dialog events for a description service as a superset of a Main service. In this example, description is an optional service type that contains all of the music, dialog, and sound effects found in the main service, but adds narration that describes the on-screen action. This service may help visually impaired users better understand the content. In the example of FIG. 15, as this service has the same language as an existing main mix, the service engine 184 distinguishes description service mixes by comparing dialog events. In this example, the speech found in the description mix is a superset of the main service dialog.

Metadata Output

In one or more embodiments of the invention, the channel detective service 180 includes functionality to update media information subsequent to the determination and categorization of audio tracks based on channel layouts, languages, and/or service types. Upon successful identification and categorization of all input tracks into coherent mixes with designated channel layout labels, language, and/or service types, the service 180 progresses to the final step of updating the media metadata info. This involves incorporating the newly assigned labels and categories into the media file's metadata, facilitating enhanced media handling by downstream services such as transcoding and packaging. The service 180 includes may be configured to execute the update by writing the determinations-including the channel layout labels, languages, and/or service types-back to the JSON media info structure.

Channel Layout Labels: In one or more embodiments of the invention, the channel detective service 180 includes functionality to assign a channel layout label that specifies the configuration of audio channels within the track. For example, labels such as "stereo," "5.1 surround," or "7.1 surround" are applied based on the analysis performed by the layout engine 182. The system ensures that these labels correspond to the physical and conceptual grouping of audio channels, as deduced from the channel and track structure analysis.

Language and Service Type Labeling: In one or more embodiments of the invention, the language engine 183 assigns a primary language label to each track, while the service engine 184 categorizes each track by service type (e.g., main, dub, description). These labels may be determined through a combination of metadata analysis, speech and dialog detection, and comparison algorithms as previously described.

JSON Metadata Update: In one or more embodiments of the invention, the channel detective service 180 includes functionality to programmatically update the JSON metadata corresponding to the media item, integrating the new metadata. For example, this update process may include the addition of key-value pairs that represent the channel layout, language, and service type for each track.

In one or more embodiments of the invention, in instances where the channel detective service 180 is unable to fully label all tracks—due to ambiguous or incomplete data, for example—the service 180 may be configured to abstain from updating the JSON metadata. In this embodiment, this conservative approach ensures that potentially incorrect or speculative information does not propagate through to downstream processing services, which could result in inaccuracies in the final media experience. In one embodiment, under these circumstances, the service 180 triggers a requirement for manual intervention (e.g., by a content processing team), signaling the need for human review and correction. In one or more embodiments of the invention, in cases tagged for manual intervention, the channel detective service 180 includes functionality to automatically generate and dispatch detailed error reports, including the analysis results and specific points of failure, to expedite review and correction processes.

Figure 16:
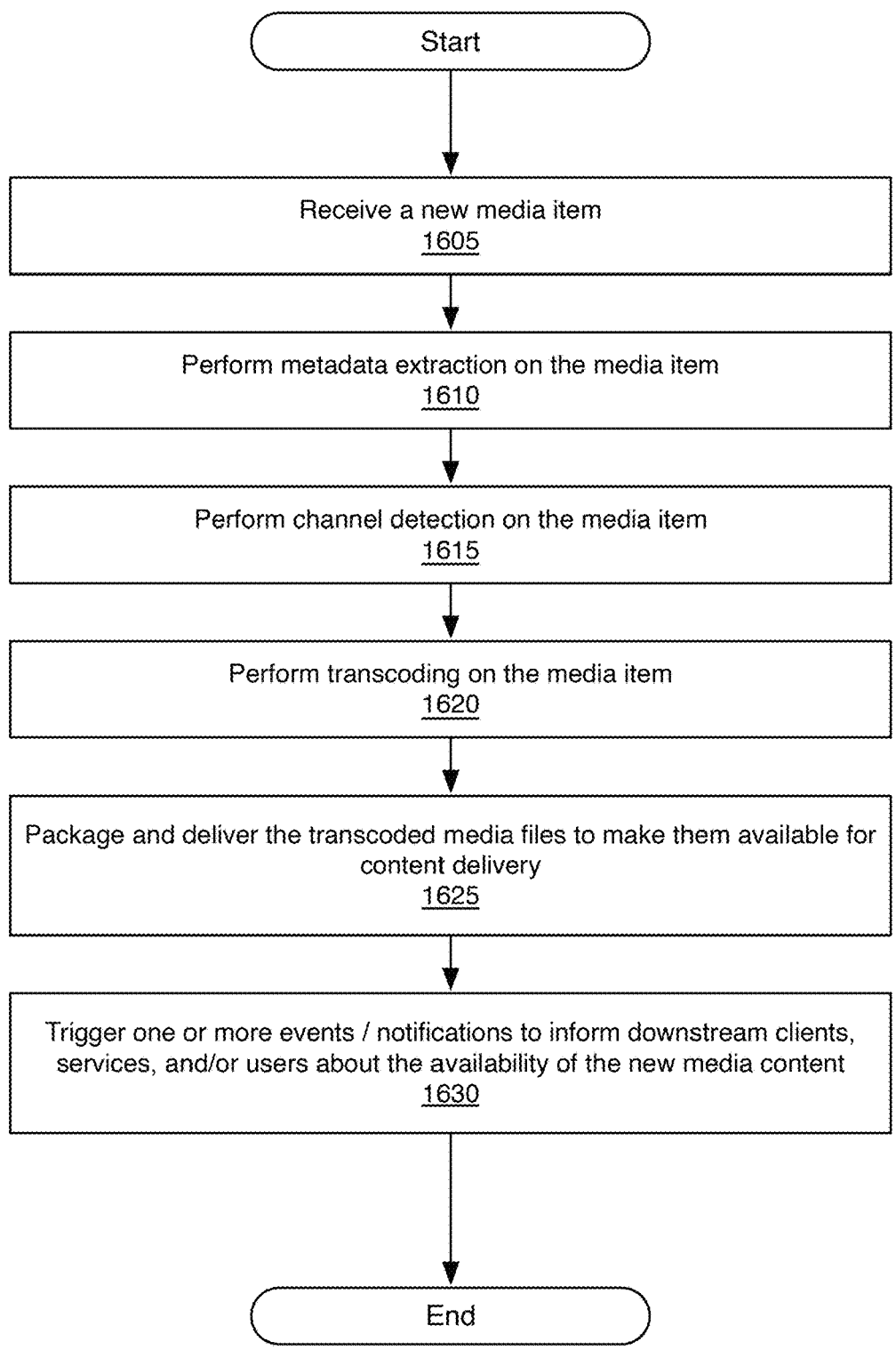
FIGS. 16 and 17 show flowcharts depicting channel layout evaluation, in accordance with one or more embodiments.

FIG. 16 shows a flowchart of a data pipeline for media ingestion and processing by a media platform. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 16 should not be construed as limiting the scope of the invention.

STEP 1605: The process initiates with the receipt of a new media item. This step may involve the media item being submitted or ingested into a data ingestion pipeline. The submission may come from various sources such as content partners or internal content management systems.

STEP 1610: Following the receipt of the media item, the next step involves extracting metadata from the item. This extraction process may contribute to understanding the media item's existing attributes, such as audio track information, language, channel layouts, and any other embedded information that will inform subsequent processing steps.

STEP 1615: After extracting metadata, the media item undergoes channel detection. This step is crucial for identifying and classifying the audio channels contained within the media item. The process involves analyzing the audio tracks to determine their layout (e.g., stereo, surround) and identifying the primary language, any dubbed versions, and/or special audio services like descriptions for the visually impaired. This detailed understanding of the media item's audio components may be necessary for proper transcoding and packaging.

STEP 1620: With the audio channels identified and classified, the media item is then transcoded. Transcoding adjusts the media item's format, resolution, bitrate, and audio configurations to match the specifications required for distribution and playback on various platforms and devices. This step ensures that the media content is optimized for quality and compatibility, addressing the diverse needs of content delivery networks and end-user devices.

STEP 1625: Once transcoding is complete, the media files are packaged and prepared for delivery. This packaging process may include the bundling of audio tracks with video content, encryption for security, and segmentation for streaming. The prepared media files are then delivered to the content delivery network or directly to the end-users, making the content accessible for consumption.

STEP 1630: The final step in the process involves triggering events or notifications to inform downstream clients, services, and/or users about the availability of the new media content. These notifications can be sent to content management systems, distribution partners, and notification services, ensuring that all stakeholders are aware of the new content's release and availability. This step may help to integrate the newly processed media item into content libraries, scheduling for broadcast, or making it available for on-demand access.

Figure 17:
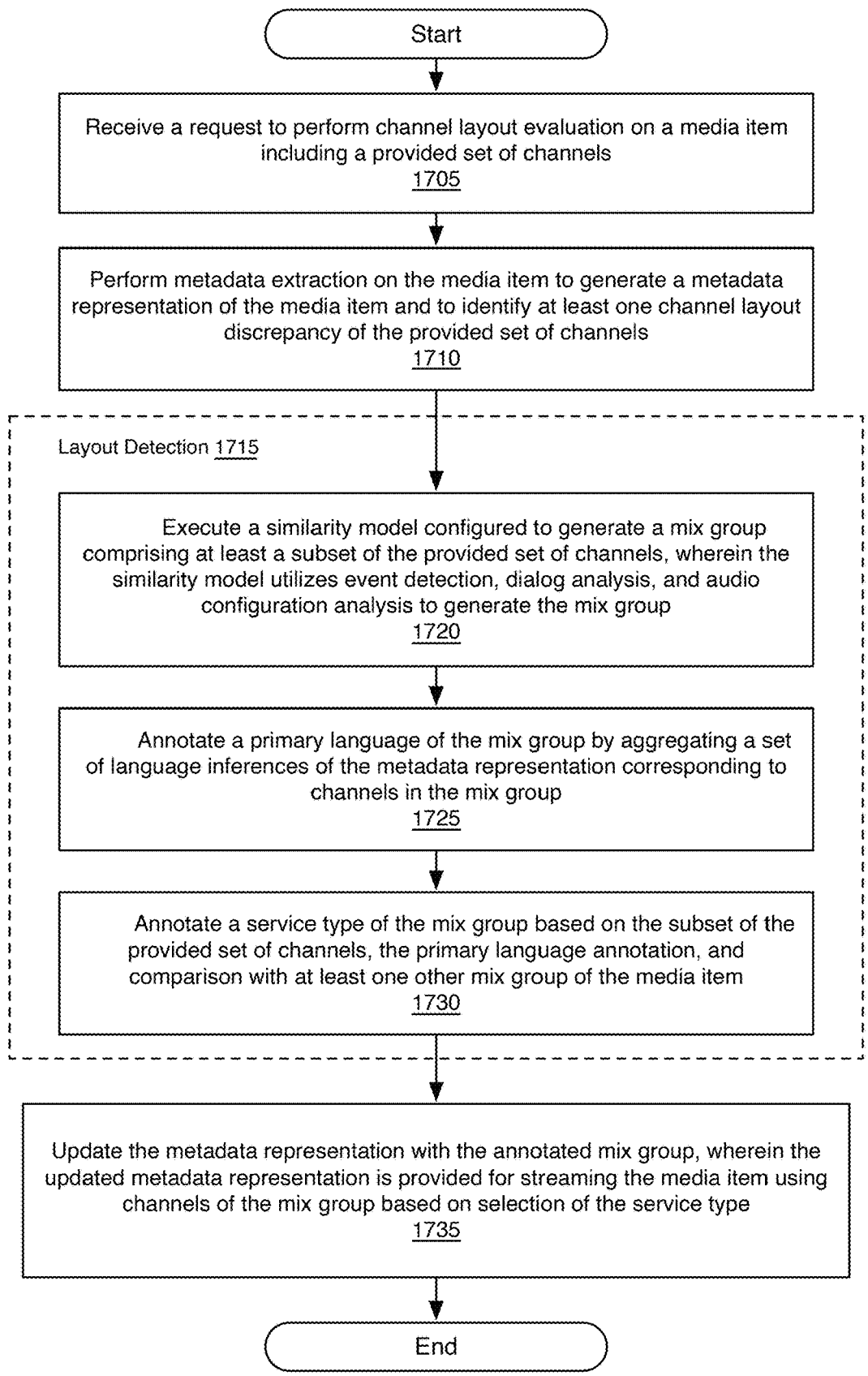

FIG. 17 shows a flowchart of method for channel layout evaluation. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 17 should not be construed as limiting the scope of the invention.

In STEP 1705, the process begins with the receipt of a request to perform a channel layout evaluation on a media item. This request may include a specific set of channels for which the evaluation is to be conducted. One objective is to analyze these channels to identify any discrepancies in the channel layout and to understand the composition and characteristics of the audio within the media item. Upon receiving the request, the process involves the evaluation of the specified set of channels within the media item.

STEP 1710: The next step involves extracting metadata from the media item. This extraction process may result in a detailed metadata representation of the media item, focusing on its audio characteristics. The metadata extracted at this stage is used for identifying discrepancies in the channel layout that was provided and subsequent remediation and accurate channel layout evaluation.

The process then enters a specialized layout detection phase 1715. This phase is composed of several steps aimed at generating a coherent representation of the media item's audio mix and structure.

STEP 1720: A similarity model is executed to analyze the provided set of channels. This model utilizes event detection, dialog analysis, and audio configuration analysis. The goal is to identify groups of channels (mix groups) that share common characteristics, suggesting they belong together in the same audio mix. The similarity model is useful in generating these mix groups by identifying patterns and relationships within the audio data.

STEP 1725: Once a mix group is established, the process involves annotating the primary language of this group. This is achieved by aggregating language inferences drawn from the metadata representation of the channels within the mix group. In one or more embodiments of the invention, the annotation of the primary language defines the linguistic composition of the mix group, which is useful for categorizing the media content accurately.

STEP 1730: Following the annotation of the primary language, the mix group is further annotated with a service type. This annotation considers the composition of the mix group, the primary language, and comparisons with other mix groups within the media item. The service type annotation is useful for distinguishing different audio services (e.g., main, dub, description) present within the media item. It enables the accurate classification of the mix groups based on their functional roles within the overall media content.

STEP 1735: The final step in the process involves updating the metadata representation of the media item with the newly annotated mix group. This updated metadata representation ensures that the media item is streamed with the appropriate audio mix, enhancing the viewing experience by matching the audio content to the viewer's preferences or requirements.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. Some of the steps may be performed simultaneously. For example, in certain circumstances, multitasking and parallel processing may be advantageous. The various example methods described and/or illustrated herein may also omit one or more of the steps described or illustrated herein or include additional steps in addition to those disclosed.

Embodiments may be implemented on a specialized computer system. The specialized computing system can include one or more modified mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments.

Figure 18:
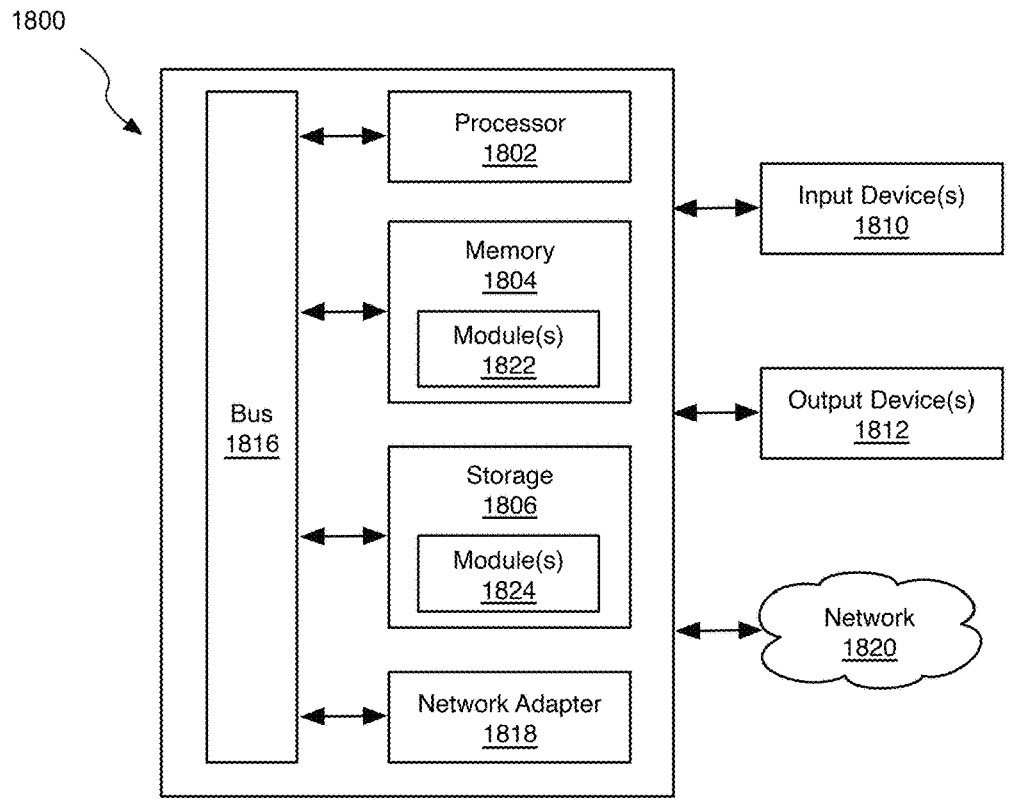
FIGS. 18 and 19 show a computing system and network architecture in accordance with one or more embodiments.

For example, as shown in FIG. 18, the computing system 1800 may include one or more computer processor(s) 1802, associated memory 1804 (e.g., random access memory (RAM), cache memory, flash memory, etc.), one or more storage device(s) 1806 (e.g., a hard disk, an optical drive such as a compact disk (CD) drive or digital versatile disk (DVD) drive, a flash memory stick, etc.), a bus 1816, and numerous other elements and functionalities. The computer processor(s) 1802 may be an integrated circuit for processing instructions. For example, the computer processor(s) may be one or more cores or micro-cores of a processor.

In one or more embodiments, the computer processor(s) 1802 may be an integrated circuit for processing instructions. For example, the computer processor(s) 1802 may be one or more cores or micro-cores of a processor. The computer processor(s) 1802 can implement/execute software modules stored by computing system 1800, such as module(s) 1822 stored in memory 1804 or module(s) 1824 stored in storage 1806. For example, one or more of the modules described herein can be stored in memory 1804 or storage 1806, where they can be accessed and processed by the computer processor 1802. In one or more embodiments, the computer processor(s) 1802 can be a special-purpose processor where software instructions are incorporated into the actual processor design.

The computing system 1800 may also include one or more input device(s) 1810, such as a touchscreen, keyboard, mouse, microphone, touchpad, electronic pen, or any other type of input device. Further, the computing system 1800 may include one or more output device(s) 1812, such as a screen (e.g., a liquid crystal display (LCD), a plasma display, touchscreen, or other display device), a printer, external storage, or any other output device. The computing system 1800 may be connected to a network 1820 (e.g., a local area network (LAN), a wide area network (WAN) such as the Internet, mobile network, or any other type of network) via a network interface connection 1818. The input and output device(s) may be locally or remotely connected (e.g., via the network 1820) to the computer processor(s) 1802, memory 1804, and storage device(s) 1806.

One or more elements of the aforementioned computing system 1800 may be located at a remote location and connected to the other elements over a network 1820. Further, embodiments may be implemented on a distributed system having a plurality of nodes, where each portion may be located on a subset of nodes within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems may also be implemented using software modules that perform certain tasks. These software modules may include script, batch, routines, programs, objects, components, data structures, or other executable files that may be stored on a computer-readable storage medium or in a computing system. These software modules may configure a computing system to perform one or more of the example embodiments disclosed herein. The functionality of the software modules may be combined or distributed as desired in various embodiments. The computer readable program code can be stored, temporarily or permanently, on one or more non-transitory computer readable storage media. The non-transitory computer readable storage media are executable by one or more computer processors to perform the functionality of one or more components of the above-described systems and/or flowcharts. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

Figure 19:
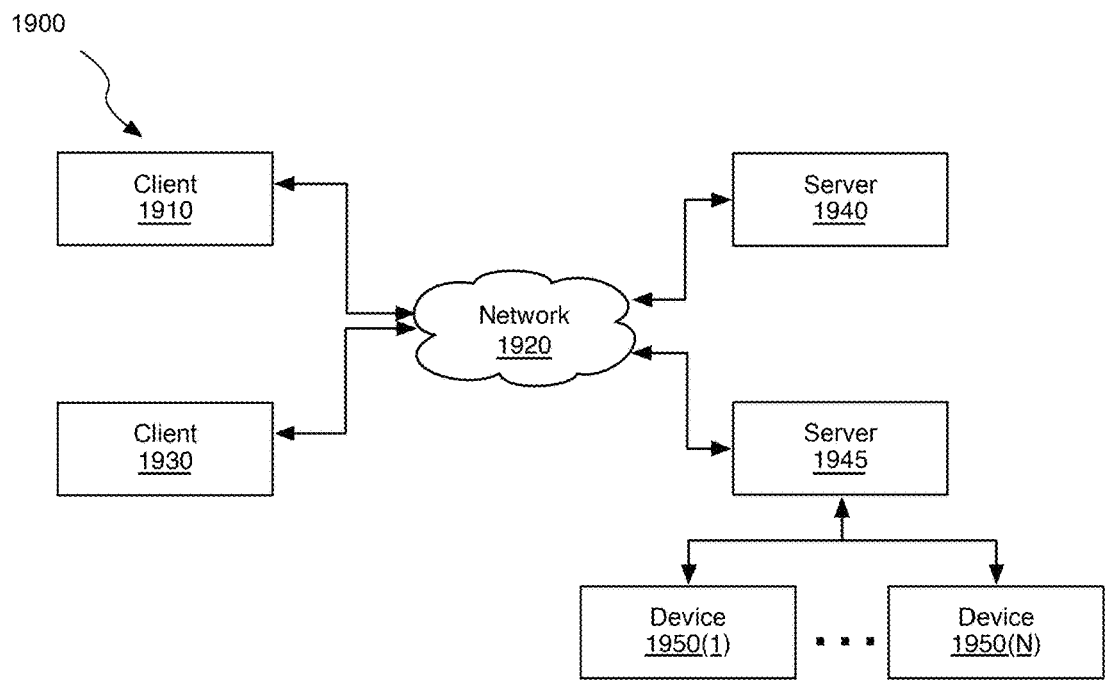

FIG. 19 is a block diagram of an example of a network architecture 1900 in which client systems 1910 and 1930, and servers 1940 and 1945, may be coupled to a network 1920. Network 1920 may be the same as or similar to network 1920. Client systems 1910 and 1930 generally represent any type or form of computing device or system, such as client devices (e.g., portable computers, smart phones, tablets, smart TVs, etc.).

Similarly, servers 1940 and 1945 generally represent computing devices or systems, such as application servers or database servers, configured to provide various database services and/or run certain software applications. Network 1920 generally represents any telecommunication or computer network including, for example, an intranet, a wide area network (WAN), a local area network (LAN), a personal area network (PAN), or the Internet.

With reference to computing system 1900 of FIG. 19, a communication interface, such as network adapter 1918, may be used to provide connectivity between each client system 1910 and 1930, and network 1920. Client systems 1910 and 1930 may be able to access information on server 1940 or 1945 using, for example, a Web browser, thin client application, or other client software. Such software may allow client systems 1910 and 1930 to access data hosted by server 1940, server 1945, or storage devices 1950(1)-(N). Although FIG. 19 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 1940, server 1945, storage devices 1950(1)-(N), or any combination thereof. All or a portion of one or more of the example embodiments disclosed herein may also be encoded as a computer program, stored in server 1940, run by server 1945, and distributed to client systems 1910 and 1930 over network 1920.

Although components of one or more systems disclosed herein may be depicted as being directly communicatively coupled to one another, this is not necessarily the case. For example, one or more of the components may be communicatively coupled via a distributed computing system, a cloud computing system, or a networked computer system communicating via the Internet.

And although only one computer system may be depicted herein, it should be appreciated that this one computer system may represent many computer systems, arranged in a central or distributed fashion. For example, such computer systems may be organized as a central cloud and/or may be distributed geographically or logically to edges of a system such as a content/data delivery network or other arrangement. It is understood that virtually any number of intermediary networking devices, such as switches, routers, servers, etc., may be used to facilitate communication.

One or more elements of the aforementioned computing system 1900 may be located at a remote location and connected to the other elements over a network 1920. Further, embodiments may be implemented on a distributed system having a plurality of nodes, where each portion may be located on a subset of nodes within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

One or more elements of the above-described systems (e.g., FIGS. 1A and 1B) may also be implemented using software modules that perform certain tasks. These software modules may include script, batch, routines, programs, objects, components, data structures, or other executable files that may be stored on a computer-readable storage medium or in a computing system. These software modules may configure a computing system to perform one or more of the example embodiments disclosed herein. The functionality of the software modules may be combined or distributed as desired in various embodiments. The computer readable program code can be stored, temporarily or permanently, on one or more non-transitory computer readable storage media. The non-transitory computer readable storage media are executable by one or more computer processors to perform the functionality of one or more components of the above-described systems (e.g., FIGS. 1A-1C) and/or flowcharts (e.g., FIGS. 16-17). Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

It is understood that a "set" can include one or more elements. It is also understood that a "subset" of the set may be a set of which all the elements are contained in the set. In other words, the subset can include fewer elements than the set or all the elements of the set (i.e., the subset can be the same as the set).

While the invention has been described with respect to a limited number of embodiments, those skilled in the art, having benefit of this disclosure, will appreciate that other embodiments may be devised that do not depart from the scope of the invention as disclosed herein.

What is claimed is:

1. A system for channel layout evaluation, comprising:
   a computer processor;
   a channel detective service executing on the computer processor and comprising functionality to:
   receive a request to perform channel layout evaluation on a media item comprising a provided set of channels;
   perform metadata extraction on the media item to generate a metadata representation of the media item and to identify at least one channel layout discrepancy of the provided set of channels;
   perform layout detection using the metadata representation by:
   executing a similarity model configured to generate a mix group comprising at least a subset of the provided set of channels, wherein the similarity model utilizes event detection, dialog analysis, and audio configuration analysis to generate the mix group;
   annotating a primary language of the mix group by aggregating a set of language inferences of the metadata representation corresponding to channels in the mix group; and
   annotating a service type of the mix group based on the subset of the provided set of channels, the primary language annotation, and comparison with at least one other mix group of the media item; and
   updating the metadata representation with the annotated mix group, wherein the updated metadata representation is provided for streaming the media item using channels of the mix group based on selection of the service type.

2. The system of claim 1, wherein the channel detective service further comprises functionality to perform a stereo pair analysis on the provided set of channels to select a matching channel pair by:
   determining that there is a loudness match between the channel pair;
   determining that there is a low frequency effect match between the channel pair;
   determining that a dialog percentage of each channel of the channel pair is within a predefined dialog matching threshold;
   determining that there is an audio event similarity match between the channel pair; and
   determining that there is a silence event similarity match between the channel pair, wherein the matching channel pair is designated for inclusion in the same mix group.

3. The system of claim 1, wherein determining that there is an audio event similarity match between the channel pair comprises:
   generating an event intersection array by performing an intersection operation on event arrays of the channel pair from the metadata representation;
   generating an event union array by performing a union operation on the event arrays of the channel pair from the metadata representation;
   calculating a summation of intersection times of the event intersection array;
   calculating a summation of union times of the event union array; and
   determining that the summation of intersection times is greater than the summation of union times multiplied by an event similarity threshold multiplier.

4. The system of claim 1, wherein the channel detective service further comprises functionality to:
   calculate a dialog score for each of the set of provided channels based on (i) a dialog percentage of the channel and (ii) a dialog loudness of the channel, wherein the dialog score is utilized by the similarity model to generate the mix group by weighting importance of each channel by its dialog score.

5. The system of claim 4, wherein the channel detective service further comprises functionality to calculate pairwise dialog scores for each channel pair of a set of channel pairs of at least a subset of the set of provided channels by:
   combining metadata of the channel pair to generate a combined dialog metadata;
   calculating a pairwise dialog percentage and a pairwise dialog loudness for the channel pair based on the combined dialog metadata; and
   calculate a pairwise dialog score for each channel of the channel pair based on (i) the pairwise dialog percentage and (ii) the pairwise dialog loudness, wherein the pairwise dialog score is utilized by the similarity model to generate the mix group by weighting importance of each channel of the channel pair by its pairwise dialog score.

6. The system of claim 1, wherein audio configuration analysis comprises:
   identifying a set of known standard layouts each corresponding to a standardized audio configuration; and
   slotting the subset of the provided set of channels into a known standard layout of the set of known standard layouts to generate the mix group.

7. The system of claim 1, wherein aggregating a set of language inferences of the metadata representation corresponding to channels in the mix group comprises:
   calculating a language inference for each of at least a subset of the provided set of channels, wherein each language inference comprises a language identifier and a confidence score for the language identifier;
   calculating a score for each language identifier of the language inferences based on a number of occurrences of the language identifier and the confidence score for each occurrence of the language identifier; and
   selecting the primary language from among the language identifiers by ranking the scores of the language identifiers.

8. The system of claim 1, wherein the service type is one selected from a group consisting of a main service type, a dub service type, and a description service type.

9. A method for channel layout evaluation, comprising:
   receiving a request to perform channel layout evaluation on a media item comprising a provided set of channels;
   performing metadata extraction on the media item to generate a metadata representation of the media item and to identify at least one channel layout discrepancy of the provided set of channels;
   performing layout detection using the metadata representation by:
      executing, by a computer processor, a similarity model configured to generate a mix group comprising at least a subset of the provided set of channels, wherein the similarity model utilizes event detection, dialog analysis, and audio configuration analysis to generate the mix group;
      annotating a primary language of the mix group by aggregating a set of language inferences of the metadata representation corresponding to channels in the mix group; and
      annotating a service type of the mix group based on the subset of the provided set of channels, the primary language annotation, and comparison with at least one other mix group of the media item; and
   updating the metadata representation with the annotated mix group, wherein the updated metadata representation is provided for streaming the media item using channels of the mix group based on selection of the service type.

10. The method of claim 9, further comprising performing a stereo pair analysis on the provided set of channels to select a matching channel pair by:
   determining that there is a loudness match between the channel pair;
   determining that there is a low frequency effect match between the channel pair;
   determining that a dialog percentage of each channel of the channel pair is within a predefined dialog matching threshold;
   determining that there is an audio event similarity match between the channel pair; and
   determining that there is a silence event similarity match between the channel pair, wherein the matching channel pair is designated for inclusion in the same mix group.

11. The method of claim 9, wherein determining that there is an audio event similarity match between the channel pair comprises:
   generating an event intersection array by performing an intersection operation on event arrays of the channel pair from the metadata representation;

generating an event union array by performing a union operation on the event arrays of the channel pair from the metadata representation;

calculating a summation of intersection times of the event intersection array;

calculating a summation of union times of the event union array; and determining that the summation of intersection times is greater than the summation of union times multiplied by an event similarity threshold multiplier.

12. The method of claim 9, further comprising:
calculating a dialog score for each of the set of provided channels based on (i) a dialog percentage of the channel and (ii) a dialog loudness of the channel, wherein the dialog score is utilized by the similarity model to generate the mix group by weighting importance of each channel by its dialog score.

13. The method of claim 12, further comprising:
calculating pairwise dialog scores for each channel pair of a set of channel pairs of at least a subset of the set of provided channels by:
combining metadata of the channel pair to generate a combined dialog metadata;
calculating a pairwise dialog percentage and a pairwise dialog loudness for the channel pair based on the combined dialog metadata; and
calculating a pairwise dialog score for each channel of the channel pair based on (i) the pairwise dialog percentage and (ii) the pairwise dialog loudness, wherein the pairwise dialog score is utilized by the similarity model to generate the mix group by weighting importance of each channel of the channel pair by its pairwise dialog score.

14. The method of claim 9, wherein audio configuration analysis comprises:
identifying a set of known standard layouts each corresponding to a standardized audio configuration; and
slotting the subset of the provided set of channels into a known standard layout of the set of known standard layouts to generate the mix group.

15. The method of claim 9, wherein aggregating a set of language inferences of the metadata representation corresponding to channels in the mix group comprises:
calculating a language inference for each of at least a subset of the provided set of channels, wherein each language inference comprises a language identifier and a confidence score for the language identifier;
calculating a score for each language identifier of the language inferences based on a number of occurrences of the language identifier and the confidence score for each occurrence of the language identifier; and
selecting the primary language from among the language identifiers by ranking the scores of the language identifiers.

16. The method of claim 9, wherein the service type is one selected from a group consisting of a main service type, a dub service type, and a description service type.

17. A non-transitory computer-readable storage medium comprising a plurality of instructions for channel layout evaluation, the plurality of instructions configured to execute on at least one computer processor to enable the at least one computer processor to:
receive a request to perform channel layout evaluation on a media item comprising a provided set of channels;
perform metadata extraction on the media item to generate a metadata representation of the media item and to identify at least one channel layout discrepancy of the provided set of channels;
perform layout detection using the metadata representation by:
executing a similarity model configured to generate a mix group comprising at least a subset of the provided set of channels, wherein the similarity model utilizes event detection, dialog analysis, and audio configuration analysis to generate the mix group;
annotating a primary language of the mix group by aggregating a set of language inferences of the metadata representation corresponding to channels in the mix group; and
annotating a service type of the mix group based on the subset of the provided set of channels, the primary language annotation, and comparison with at least one other mix group of the media item; and
update the metadata representation with the annotated mix group, wherein the updated metadata representation is provided for streaming the media item using channels of the mix group based on selection of the service type.

18. The non-transitory computer-readable storage medium of claim 17, the plurality of instructions further configured to enable the at least one computer processor to perform a stereo pair analysis on the provided set of channels to select a matching channel pair by:
determining that there is a loudness match between the channel pair;
determining that there is a low frequency effect match between the channel pair;
determining that a dialog percentage of each channel of the channel pair is within a predefined dialog matching threshold;
determining that there is an audio event similarity match between the channel pair; and
determining that there is a silence event similarity match between the channel pair, wherein the matching channel pair is designated for inclusion in the same mix group.

19. The non-transitory computer-readable storage medium of claim 17, wherein determining that there is an audio event similarity match between the channel pair comprises:
generating an event intersection array by performing an intersection operation on event arrays of the channel pair from the metadata representation;
generating an event union array by performing a union operation on the event arrays of the channel pair from the metadata representation;
calculating a summation of intersection times of the event intersection array;
calculating a summation of union times of the event union array; and
determining that the summation of intersection times is greater than the summation of union times multiplied by an event similarity threshold multiplier.

20. The non-transitory computer-readable storage medium of claim 17, the plurality of instructions further configured to enable the at least one computer processor to:
calculate a dialog score for each of the set of provided channels based on (i) a dialog percentage of the channel and (ii) a dialog loudness of the channel, wherein the dialog score is utilized by the similarity model to generate the mix group by weighting importance of each channel by its dialog score.

* * * * *